(12) United States Patent
Zhao et al.

(10) Patent No.: US 11,924,431 B2
(45) Date of Patent: Mar. 5, 2024

(54) LMCS-BASED IMAGE CODING METHOD AND DEVICE THEREFOR

(71) Applicant: LG ELECTRONICS INC., Seoul (KR)

(72) Inventors: Jie Zhao, Seoul (KR); Seunghwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 271 days.

(21) Appl. No.: 17/432,830

(22) PCT Filed: Feb. 26, 2020

(86) PCT No.: PCT/KR2020/002751
§ 371 (c)(1),
(2) Date: Aug. 20, 2021

(87) PCT Pub. No.: WO2020/180044
PCT Pub. Date: Sep. 10, 2020

(65) Prior Publication Data
US 2022/0124338 A1 Apr. 21, 2022

Related U.S. Application Data

(60) Provisional application No. 62/812,917, filed on Mar. 1, 2019.

(51) Int. Cl.
*H04N 19/132* (2014.01)
*H04N 19/169* (2014.01)
(Continued)

(52) U.S. Cl.
CPC ......... *H04N 19/132* (2014.11); *H04N 19/176* (2014.11); *H04N 19/186* (2014.11); *H04N 19/1887* (2014.11); *H04N 19/30* (2014.11)

(58) Field of Classification Search
CPC .. H04N 19/159; H04N 19/176; H04N 19/107; H04N 19/117; H04N 19/124; H04N 19/132; H04N 19/136; H04N 19/174; H04N 19/182; H04N 19/186; H04N 19/1887; H04N 19/1883; H04N 19/50;
(Continued)

(56) References Cited

U.S. PATENT DOCUMENTS

2021/0211738 A1* 7/2021 Yin .................. H04N 19/85
2021/0274201 A1* 9/2021 Xu .................. H04N 19/105

FOREIGN PATENT DOCUMENTS

KR 10-2015-0119463 A 10/2014
KR 10-2018-0016389 A 2/2018
(Continued)

OTHER PUBLICATIONS

Lu et al., "CE12: Mapping Functions (test CE12-1 and CE12-2)", JVET-M0427-v2 (2019).

*Primary Examiner* — Nathnael Aynalem
(74) *Attorney, Agent, or Firm* — Bryan Cave Leighton Paisner LLP

(57) ABSTRACT

According to embodiment(s) disclosed in the present document, a reshaper model used in coding including LMCS can modify a value of a delta codeword on the basis of luma bit depth and perform reshaping on the basis of determination on whether or not a reshaper is linear, and thus, signaling overhead at a higher bit depth and overhead for signaling values of delta codewords for all bins can be reduced.

11 Claims, 17 Drawing Sheets

(51) Int. Cl.
*H04N 19/176* (2014.01)
*H04N 19/186* (2014.01)
*H04N 19/30* (2014.01)

(58) Field of Classification Search
CPC .... H04N 19/503; H04N 19/593; H04N 19/59; H04N 19/587; H04N 19/513; H04N 19/517; H04N 19/52; H04N 19/86; H04N 19/172; H04N 19/17; H04N 19/103; H04N 19/105; H04N 19/109; H04N 19/11; H04N 19/463
USPC ........................................ 375/240.01–240.29
See application file for complete search history.

(56) References Cited

FOREIGN PATENT DOCUMENTS

| | | |
|---|---|---|
| KR | 10-2018-0026517 A | 3/2018 |
| KR | 10-2018-0056704 A | 5/2018 |

\* cited by examiner

[Table 3]

LMCS-BASED IMAGE CODING METHOD AND DEVICE THEREFOR

CROSS-REFERENCE TO PRIOR APPLICATIONS

This application is a National Stage of PCT/KR2020/002751, filed Feb. 26, 2020, published on Sep. 10, 2020, as WO 2020/180044, which claims priority to U.S. Provisional Application No. 62/812,917, filed Mar. 1, 2019, each hereby expressly incorporated by reference in its entirety.

BACKGROUND OF THE DISCLOSURE

Field of the Disclosure

The present document relates to luma mapping chroma scaling (LMCS) based video or image coding.

Related Art

Recently, demand for high-quality image/video has increased in various fields. As image/video data has high resolution and high quality, the amount of information or bits to be transmitted increases relative to the existing image/video data, and thus, transmitting image data using a medium such as an existing wired/wireless broadband line or an existing storage medium or storing image/video data using existing storage medium increase transmission cost and storage cost.

Accordingly, a highly efficient image/video compression technology is required to effectively compress, transmit, store, and reproduce information of a high-resolution, high-quality image/video having various characteristics as described above.

Specifically, signaling overhead in a reshaping (mapping) process of LMCS based image coding is a problem, and a technique for reducing overhead in a particularly high bit depth is required.

SUMMARY

According to an embodiment of the present document, an image decoding method performed by a decoding apparatus is provided. The image decoding method may perform reshaping on luma prediction sample values based on the reshaping related information, and the reshaping related information may include information on an absolute value of a delta codeword and information on a sign of the delta codeword for deriving a linear or piecewise-linear reshaper.

According to another embodiment of the present document, a decoding apparatus for performing image decoding is provided. The decoding apparatus may perform reshaping on luma prediction sample values based on the reshaping related information, and the reshaping related information may include information on an absolute value of a delta codeword and information on a sign of the delta codeword for deriving a linear or piecewise-linear reshaper.

According to another embodiment of the present document, an image encoding method performed by an encoding apparatus is provided. The image encoding method may perform reshaping on luma prediction sample values based on the reshaping related information, and the reshaping related information may include information on an absolute value of a delta codeword and information on a sign of the delta codeword for deriving a linear or piecewise-linear reshaper.

According to another embodiment of the present document, an encoding apparatus for performing image encoding is provided. The encoding apparatus may perform reshaping on luma prediction sample values based on the reshaping related information, and the reshaping related information may include information on an absolute value of a delta codeword and information on a sign of the delta codeword for deriving a linear or piecewise-linear reshaper.

According to another embodiment of the present document, there is provided a computer-readable storage medium for storing encoded information (or instruction information) causing the decoding apparatus to perform the image decoding method according to the above-described embodiment.

According to another embodiment of the present document, there is provided a computer-readable storage medium storing information causing an encoding apparatus to perform an image encoding method according to the above-described embodiment.

Advantageous Effects

According to an embodiment of the present document, overall image/video compression efficiency may be improved.

According to the present document, the efficiency of intra/inter prediction can be increased.

According to the present document, image coding efficiency can be increased based on LMCS.

According to the present document, it is possible to increase the efficiency for generating a reconstructed sample based on the LMCS.

With the LMCS according to the present document, the overhead caused by signaling syntax elements at a high bit depth can be reduced.

Based on the LMCS according to the present document, an option of signaling the linear reshaper is provided and the signaling of the reshaper may occur more frequently.

DESCRIPTION OF EXEMPLARY EMBODIMENTS

Figure 1:
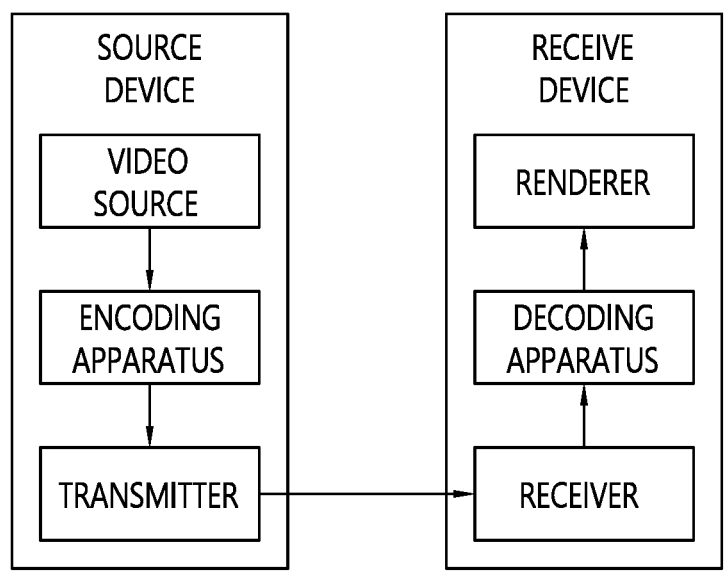
FIG. 1 illustrates an example of a video/image coding system to which the embodiments of the present document may be applied.

The present document may be modified in various forms, and specific embodiments thereof will be described and shown in the drawings. However, the embodiments are not intended for limiting the present document. The terms used in the following description are used to merely describe specific embodiments, but are not intended to limit the present document. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, each configuration in the drawings described in the present document is shown independently for the convenience of description regarding different characteristic functions, and does not mean that each configuration is implemented as separate hardware or separate software. For example, two or more components among each component may be combined to form one component, or one component may be divided into a plurality of components. Embodiments, in which each component is integrated and/or separated, are also included in the scope of the present document, since it is not departed from the essence of the present document.

In the present document, "A or B" may mean "only A", "only B" or "both A and B". In other words, "A or B" in the present document may be interpreted as "A and/or B". For example, in the present document "A, B or C (A, B or C)" means "only A", "only B", "only C", or "any combination of A, B and C".

A slash (/) or comma (comma) used in the present document may mean "and/or". For example, "A/B" may mean "A and/or B". Accordingly, "A/B" may mean "only A", "only B", or "both A and B". For example, "A, B, C" may mean "A, B, or C".

In the present document, "at least one of A and B" may mean "only A", "only B" or "both A and B". Also, in the present document, the expression "at least one of A or B" or "at least one of A and/or B" may be interpreted the same as "at least one of A and B".

Also, in the present document, "at least one of A, B and C" means "only A", "only B", "only C", or "any combination of A, B and C". Also, "at least one of A, B or C" or "at least one of A, B and/or C" may mean "at least one of A, B and C".

Also, parentheses used in the present document may mean "for example". Specifically, when "prediction (intra prediction)" is indicated, "intra prediction" may be proposed as an example of "prediction". In other words, "prediction" in the present document is not limited to "intra prediction", and "intra prediction" may be proposed as an example of "prediction". Also, even when "prediction (i.e., intra prediction)" is indicated, "intra prediction" may be proposed as an example of "prediction".

Technical features that are individually described in one drawing in the present document may be implemented individually or simultaneously.

The following description may be applied to a technical field dealing with a video, an image, or an image. For example, the methods or embodiments disclosed in the following description are the Versatile Video Coding (VVC) standard (ITU-T Rec. H.266), essential video coding (EVC) standard, AV1 (AOMedia Video 1) standard, AVS2 (2nd generation of audio video coding standard) or next-generation video/video coding standard (ex. H.267 or H.268, etc.), next-generation video/image coding standard after VVC, or standards before VVC (eg, It may relate to the disclosure of the High Efficiency Video Coding (HEVC) standard (ITU-T Rec. H.265), etc.).

Hereinafter, examples of the present embodiment will be described in detail with reference to the accompanying drawings. In addition, like reference numerals are used to indicate like elements throughout the drawings, and the same descriptions on the like elements are omitted.

FIG. 1 illustrates an example of a video/image coding system to which the embodiments of the present document may be applied. Referring to FIG. 1, a video/image coding system may include a first device (a source device) and a second device (a reception device). The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. For example, the video/image capture device may include one or more cameras, and/or video/image archives including previously captured video/images, and the like. For example, the video/image generating device may include computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

In the present document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. One picture may consist of one or more tile groups. One tile group may include one or more tiles. Each tile may consist of one or more CTU rows. The CTUs may be ordered in a CTU raster scan, and a tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice may consists of either a number of complete tiles. In the present document, a tile group, and a picture and a slice may be used in place of each other. For example, in the present document, a tile group/tile group header may be referred to as a picture/picture header or a slice/slice header.

An "image" may mean a concept including a still image and a video, which is a set of a series of still images according to the passage of time. Also, "video" does not necessarily mean only a set of a series of still images according to the passage of time, and in some embodiments, a still image may be interpreted as a concept included in a video.

A pixel or a pel may mean a smallest unit constituting one picture (or image). Also, 'sample' may be used as a term corresponding to a pixel. A sample may generally represent a pixel or a value of a pixel. Specifically, the sample may represent a pixel/pixel value of a luma component, and/or may represent a pixel/pixel value of a chroma component.

In the present document, the term 'sample' may be interpreted as 'sample value' or 'value of sample'. 'Sample value' and 'value of sample' may correspond to the 'pixel value' and the 'value of pixel'. For example, 'luma prediction samples' may be interpreted as 'luma prediction sample values' or 'values of luma prediction samples'.

A unit may represent a basic unit of image processing. The unit may include at least one of a specific area of the picture and information related to the area. One unit may include one luma block and two chroma (ex. cb, cr) blocks. The unit may be used interchangeably with terms such as block or area in some cases. In a general case, an M×N block may represent samples (or sample arrays) or a set of transform coefficients of M columns and N rows.

Figure 2:
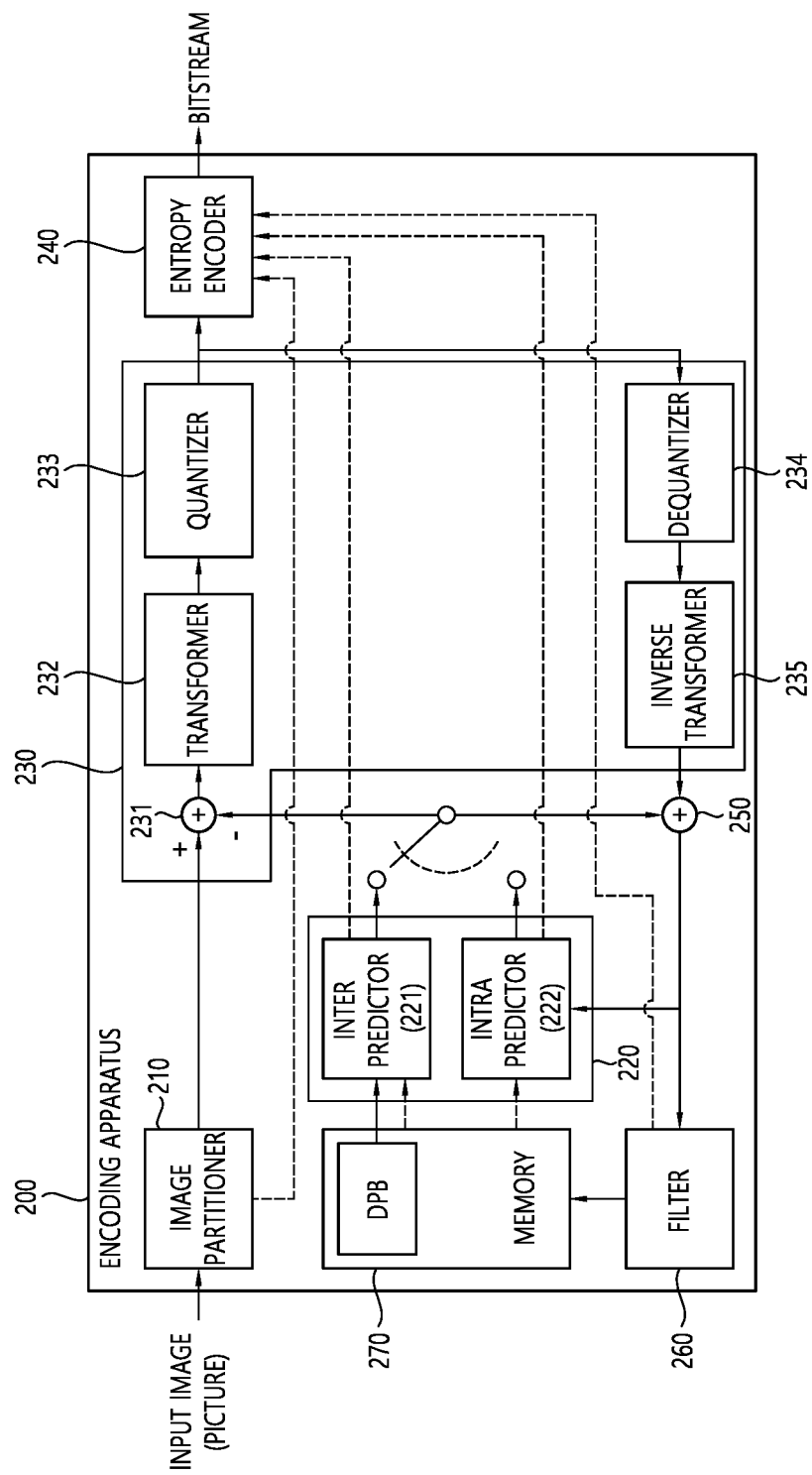
FIG. 2 is a diagram schematically illustrating a configuration of a video/image encoding apparatus to which the embodiments of the present document may be applied.

FIG. 2 is a diagram schematically illustrating a configuration of a video/image encoding apparatus to which the embodiments of the present document may be applied. Hereinafter, what is referred to as the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset (SAO), an adaptive loop filtering (ALF), a bilateral filtering, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB in the memory 270 may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
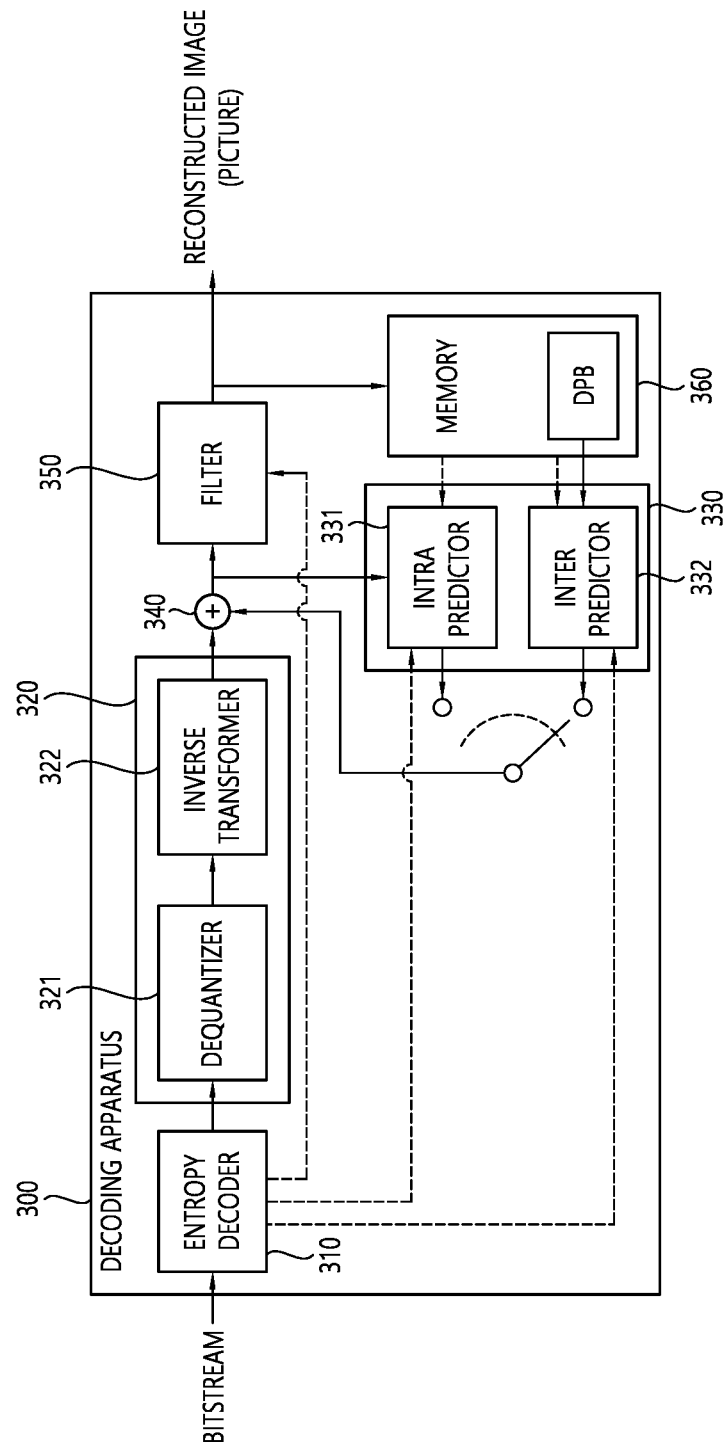
FIG. 3 is a diagram schematically illustrating a configuration of a video/image decoding apparatus to which the embodiments of the present document may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, information on a palette table and a palette index may be included in the video/image information and signaled.

The intra predictor 331 may predict the current block by referring to the samples in the current picture. The referred samples may be located in the neighborhood of the current block or may be located apart according to the prediction mode. In the intra prediction, intra prediction modes may include a plurality of non-directional modes and a plurality of directional modes. The intra predictor 331 may determine the intra prediction mode applied to the current block by using a intra prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present document, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, in video coding, prediction is performed to increase compression efficiency. Through this, it is possible to generate a predicted block including prediction samples for a current block, which is a block to be coded. Here, the predicted block includes prediction samples in a spatial domain (or pixel domain). The predicted block is derived equally from the encoding device and the decoding device, and the encoding device decodes information (residual information) on the residual between the original block and the predicted block, not the original sample value of the original block itself. By signaling to the device, image coding efficiency can be increased. The decoding apparatus may derive a residual block including residual samples based on the residual information, and generate a reconstructed block including reconstructed samples by summing the residual block and the predicted block, and generate a reconstructed picture including reconstructed blocks.

The residual information may be generated through transformation and quantization processes. For example, the encoding apparatus may derive a residual block between the original block and the predicted block, and perform a transform process on residual samples (residual sample array) included in the residual block to derive transform coefficients, and then, by performing a quantization process on the transform coefficients, derive quantized transform coefficients to signal the residual related information to the decoding apparatus (via a bitstream). Here, the residual information may include location information, a transform technique, a transform kernel, and a quantization parameter, value information of the quantized transform coefficients etc. The decoding apparatus may perform dequantization/inverse transformation process based on the residual information and derive residual samples (or residual blocks). The decoding apparatus may generate a reconstructed picture based on the predicted block and the residual block. The encoding apparatus may also dequantize/inverse transform the quantized transform coefficients for reference for inter prediction of a later picture to derive a residual block, and generate a reconstructed picture based thereon. In the present document, at least one of quantization/dequantization and/or transform/inverse transform may be omitted. When the quantization/dequantization is omitted, the quantized transform coefficient may be referred to as a transform coefficient. When the transform/inverse transform is omitted, the transform coefficients may be called coefficients or residual coefficients, or may still be called transform coefficients for uniformity of expression. In the present document, a quantized transform coefficient and a transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or information on the transform coefficient(s)), and scaled transform coefficients may be derived through inverse transform (scaling) on the transform coefficients. Residual samples may be derived based on an inverse transform (transform) of the scaled transform coefficients. This may be applied/expressed in other parts of the present document as well.

Intra prediction may refer to prediction that generates prediction samples for the current block based on reference samples in a picture to which the current block belongs (hereinafter, referred to as a current picture). When intra prediction is applied to the current block, neighboring reference samples to be used for intra prediction of the current block may be derived. The neighboring reference samples of the current block may include samples adjacent to the left boundary of the current block having a size of nW×nH and a total of 2×nH samples neighboring the bottom-left, samples adjacent to the top boundary of the current block and a total of 2×nW samples neighboring the top-right, and one sample neighboring the top-left of the current block. Alternatively, the neighboring reference samples of the current block may include a plurality of upper neighboring samples and a plurality of left neighboring samples. In addition, the neighboring reference samples of the current block may include a total of nH samples adjacent to the right boundary of the current block having a size of nW×nH, a total of nW samples adjacent to the bottom boundary of the current block, and one sample neighboring (bottom-right) neighboring bottom-right of the current block.

However, some of the neighboring reference samples of the current block may not be decoded yet or available. In this case, the decoder may configure the neighboring reference samples to use for prediction by substituting the samples that are not available with the available samples. Alternatively, neighboring reference samples to be used for prediction may be configured through interpolation of the available samples.

When the neighboring reference samples are derived, (i) the prediction sample may be derived based on the average or interpolation of neighboring reference samples of the current block, and (ii) the prediction sample may be derived based on the reference sample present in a specific (prediction) direction for the prediction sample among the periphery reference samples of the current block. The case of (i) may be called non-directional mode or non-angular mode and the case of (ii) may be called directional mode or angular mode.

Furthermore, the prediction sample may also be generated through interpolation between the second neighboring sample and the first neighboring sample located in a direction opposite to the prediction direction of the intra prediction mode of the current block based on the prediction sample of the current block among the neighboring reference samples. The above case may be referred to as linear interpolation intra prediction (LIP). In addition, chroma prediction samples may be generated based on luma samples using a linear model. This case may be called LM mode.

In addition, a temporary prediction sample of the current block may be derived based on filtered neighboring reference samples, and at least one reference sample derived according to the intra prediction mode among the existing neighboring reference samples, that is, unfiltered neighboring reference samples, and the temporary prediction sample may be weighted-summed to derive the prediction sample of the current block. The above case may be referred to as position dependent intra prediction (PDPC).

In addition, a reference sample line having the highest prediction accuracy among the neighboring multi-reference sample lines of the current block may be selected to derive the prediction sample by using the reference sample located in the prediction direction on the corresponding line, and then the reference sample line used herein may be indicated (signaled) to the decoding apparatus, thereby performing intra-prediction encoding. The above case may be referred to as multi-reference line (MRL) intra prediction or MRL based intra prediction.

In addition, intra prediction may be performed based on the same intra prediction mode by dividing the current block into vertical or horizontal subpartitions, and neighboring reference samples may be derived and used in the subpartition unit. That is, in this case, the intra prediction mode for the current block is equally applied to the subpartitions, and the intra prediction performance may be improved in some cases by deriving and using the neighboring reference samples in the subpartition unit. Such a prediction method may be called intra subpartitions (ISP) or ISP based intra prediction.

The above-described intra prediction methods may be called an intra prediction type separately from the intra prediction mode. The intra prediction type may be called in various terms such as an intra prediction technique or an additional intra prediction mode. For example, the intra prediction type (or additional intra prediction mode) may include at least one of the above-described LIP, PDPC, MRL, and ISP. A general intra prediction method except for the specific intra prediction type such as LIP, PDPC, MRL, or ISP may be called a normal intra prediction type. The normal intra prediction type may be generally applied when the specific intra prediction type is not applied, and prediction may be performed based on the intra prediction mode described above. Meanwhile, post-filtering may be performed on the predicted sample derived as needed.

Specifically, the intra prediction procedure may include an intra prediction mode/type determination step, a neighboring reference sample derivation step, and an intra prediction mode/type based prediction sample derivation step. In addition, a post-filtering step may be performed on the predicted sample derived as needed.

When intra prediction is applied, the intra prediction mode applied to the current block may be determined using the intra prediction mode of the neighboring block. For example, the decoding apparatus may select one of most probable mode (mpm) candidates of an mpm list derived based on the intra prediction mode of the neighboring block (ex. left and/or upper neighboring blocks) of the current block based on the received mpm index and select one of the other remaining intro prediction modes not included in the mpm candidates (and planar mode) based on the remaining intra prediction mode information. The mpm list may be configured to include or not include a planar mode as a candidate. For example, if the mpm list includes the planar mode as a candidate, the mpm list may have six candidates.

If the mpm list does not include the planar mode as a candidate, the mpm list may have three candidates. When the mpm list does not include the planar mode as a candidate, a not planar flag (ex. intra_luma_not_planar_flag) indicating whether an intra prediction mode of the current block is not the planar mode may be signaled. For example, the mpm flag may be signaled first, and the mpm index and not planar flag may be signaled when the value of the mpm flag is 1. In addition, the mpm index may be signaled when the value of the not planar flag is 1. Here, the mpm list is configured not to include the planar mode as a candidate does not is to signal the not planar flag first to check whether it is the planar mode first because the planar mode is always considered as mpm.

For example, whether the intra prediction mode applied to the current block is in mpm candidates (and planar mode) or in remaining mode may be indicated based on the mpm flag (ex. Intra_luma_mpm_flag). A value 1 of the mpm flag may indicate that the intra prediction mode for the current block is within mpm candidates (and planar mode), and a value 0 of the mpm flag may indicate that the intra prediction mode for the current block is not in the mpm candidates (and planar mode). The value 0 of the not planar flag (ex. Intra_luma_not_planar_flag) may indicate that the intra prediction mode for the current block is planar mode, and the value 1 of the not planar flag value may indicate that the intra prediction mode for the current block is not the planar mode. The mpm index may be signaled in the form of an mpm_idx or intra_luma_mpm_idx syntax element, and the remaining intra prediction mode information may be signaled in the form of a rem_intra_luma_pred_mode or intra_luma_mpm_remainder syntax element. For example, the remaining intra prediction mode information may index remaining intra prediction modes not included in the mpm candidates (and planar mode) among all intra prediction modes in order of prediction mode number to indicate one of them. The intra prediction mode may be an intra prediction mode for a luma component (sample). Hereinafter, intra prediction mode information may include at least one of the mpm flag (ex. Intra_luma_mpm_flag), the not planar flag (ex. Intra_luma_not_planar_flag), the mpm index (ex. mpm_idx or intra_luma_mpm_idx), and the remaining intra prediction mode information (rem_intra_luma_pred_mode or intra_luma_mpm_remainder). In the present document, the MPM list may be referred to in various terms such as MPM candidate list and candModeList. When MIP is applied to the current block, a separate mpm flag (ex. intra_mip_mpm_flag), an mpm index (ex. intra_mip_mpm_idx), and remaining intra prediction mode information (ex. intra_mip_mpm_remainder) for MIP may be signaled and the not planar flag is not signaled.

In other words, in general, when block splitting is performed on an image, a current block and a neighboring block to be coded have similar image characteristics. Therefore, the current block and the neighboring block have a high probability of having the same or similar intra prediction mode. Thus, the encoder may use the intra prediction mode of the neighboring block to encode the intra prediction mode of the current block.

For example, the encoder/decoder may configure a list of most probable modes (MPM) for the current block. The MPM list may also be referred to as an MPM candidate list. Herein, the MPM may refer to a mode used to improve coding efficiency in consideration of similarity between the current block and neighboring block in intra prediction mode coding. As described above, the MPM list may be configured to include the planar mode or may be configured to exclude the planar mode. For example, when the MPM list includes the planar mode, the number of candidates in the MPM list may be 6. And, if the MPM list does not include the planar mode, the number of candidates in the MPM list may be 5.

The encoder/decoder may configure an MPM list including 6 MPMs.

In order to configure the MPM list, three types of modes can be considered: default intra modes, neighbor intra modes, and the derived intra modes.

For the neighboring intra modes, two neighboring blocks, i.e., a left neighboring block and an upper neighboring block, may be considered.

As described above, if the MPM list is configured not to include the planar mode, the planar mode is excluded from the list, and the number of MPM list candidates may be set to 5.

Figure 4:
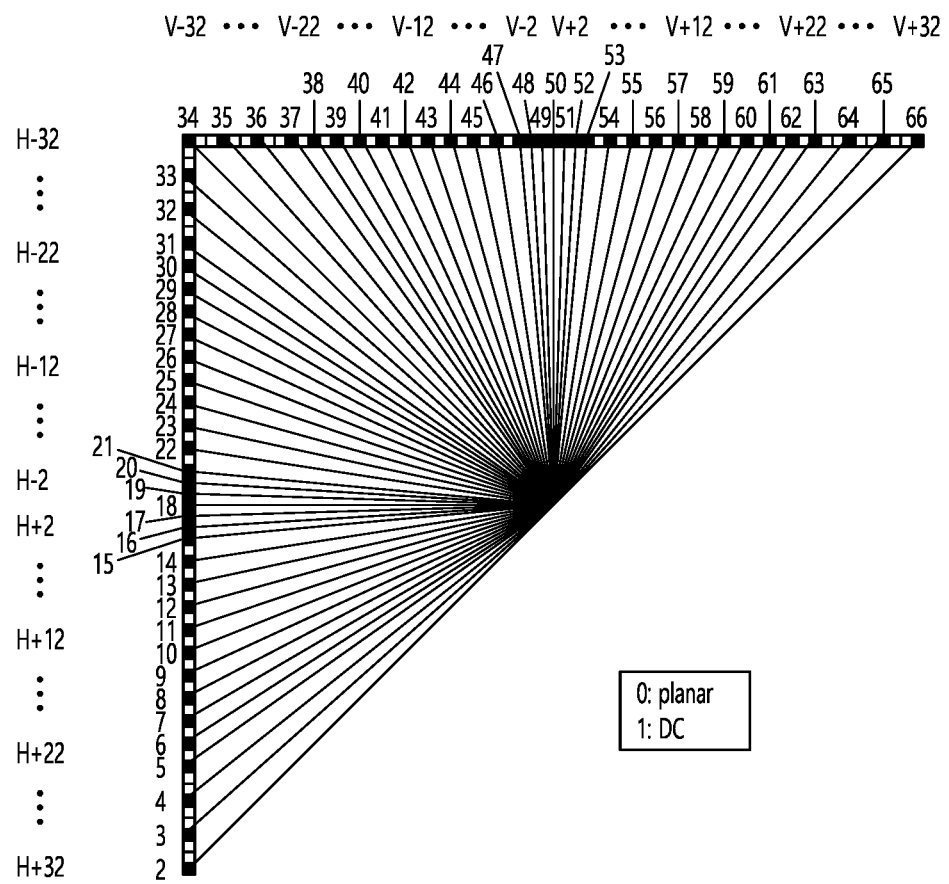
FIG. 4 illustrates intra-directional modes of 65 prediction directions exemplarily.

FIG. 4 illustrates intra-directional modes of 65 prediction directions exemplarily.

Referring to FIG. 4, among the intra prediction modes, the directional mode (or angular mode) is the intra prediction mode having horizontal directionality and vertical directionality with respect to the intra prediction mode No. 34 having a left-up diagonal prediction direction) can be distinguished. H and V in FIG. 4 mean horizontal direction and vertical direction, respectively, and numbers −32 to 32 indicate a displacement of $\frac{1}{32}$ units on a sample grid position. Intra prediction modes 2 to 33 have horizontal directionality, and intra prediction modes 34 to 66 have vertical directionality. The intra prediction mode 18 and The intra prediction mode 50 represent a horizontal intra prediction mode and a vertical intra prediction mode, respectively, and No. 2 intra prediction mode is a left-down diagonal intra prediction mode, The 34th intra prediction mode may be referred to as a left-up diagonal intra prediction mode, and the 66th intra prediction mode may be referred to as a right-up diagonal intra prediction mode. In one example, the numbers of respective intra prediction modes may be referred to as values of respective intra prediction modes. For example, the value of the horizontal intra prediction mode may be 18 and the value of the vertical intra prediction mode may be 50.

In addition, the non-directional mode (or non-angular mode) among the intra prediction modes may include a DC mode based on the average of neighboring reference samples of the current block or a planar mode based on interpolation.

Figure 5:
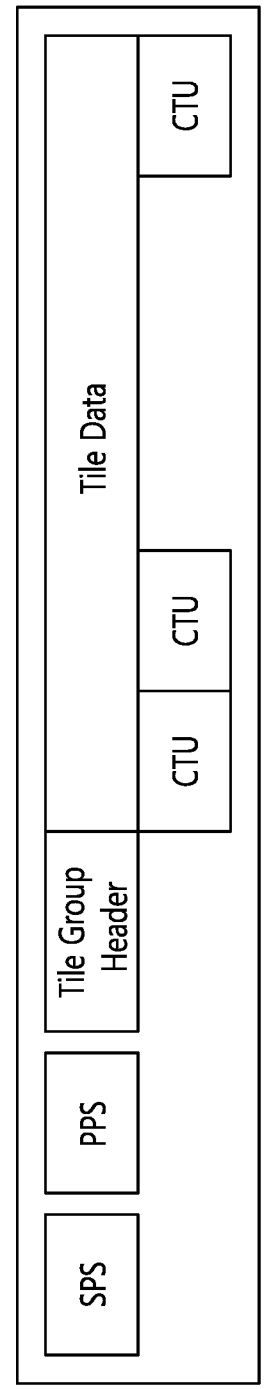
FIG. 5 exemplarily illustrates a hierarchical structure of a CVS.

FIG. 5 exemplarily illustrates a hierarchical structure of a CVS. A coded video sequence (CVS) may include a sequence parameter set (SPS), a picture parameter set (PPS), a tile group header, tile data, and/or CTU(s). Here, the tile group header and the tile data may be referred to as a slice header and slice data, respectively.

The SPS may include flags natively to enable tools to be used in CVS. In addition, the SPS may be referred to by the PPS including information on parameters that change for each picture. Each of the coded pictures may include one or more coded rectangular domain tiles. The tiles may be grouped into raster scans forming tile groups. Each tile group is encapsulated with header information called a tile group header. Each tile consists of a CTU comprising coded data. Here the data may include original sample values, prediction sample values, and its luma and chroma components (luma prediction sample values and chroma prediction sample values).

Figure 6:
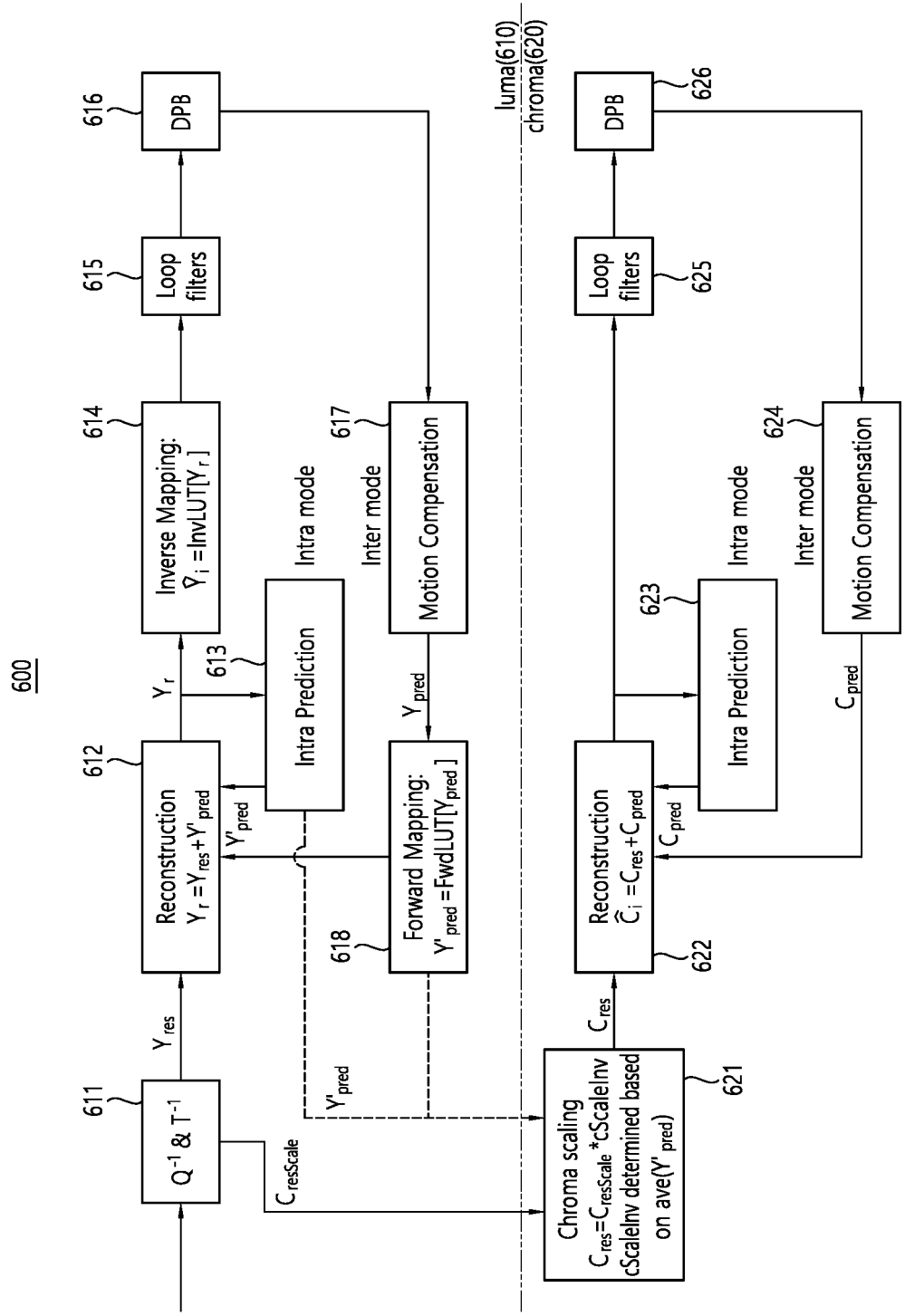
FIG. 6 illustrates an exemplary LMCS structure according to an embodiment of the present document.

FIG. 6 illustrates an exemplary LMCS structure according to an embodiment of the present document. The LMCS structure 600 of FIG. 6 includes an in-loop mapping part 610 of luma components based on adaptive piecewise linear (adaptive PWL) models and a luma-dependent chroma residual scaling part 620 for chroma components. The dequantization and inverse transform 611, reconstruction 612, and intra prediction 613 blocks of the in-loop mapping part 610 represent processes applied in the mapped (reshaped) domain. Loop filters 615, DPB (616) motion compensation or inter prediction 617 blocks of the in-loop mapping part 610, and reconstruction 622, intra prediction 623, motion compensation or inter prediction 624, loop filters 625, DPB (626) block of the chroma residual scaling part 620 represent processes applied in the original (non-mapped, non-reshaped) domain.

As illustrated in FIG. 6, when LMCS is enabled, at least one of the inverse mapping (reshaping) process 614, a forward mapping (reshaping) process 618, and a chroma scaling process 621 may be applied. For example, the inverse mapping process may be applied to a (reconstructed) luma sample (or luma samples or luma sample array) in a reconstructed picture. The inverse mapping process may be performed based on a piecewise function (inverse) index of a luma sample. The piecewise function (inverse) index may identify the piece to which the luma sample belongs. Output of the inverse mapping process is a modified (reconstuctred) luma sample (or modified luma samples or modified luma sample array). The LMCS may be enabled or disabled at a level of a tile group (or slice), picture or higher.

The forward mapping process and/or the chroma scaling process may be applied to generate the reconstructed picture. A picture may comprise luma samples and chroma samples. A reconstructed picture with luma samples may be referred to as a reconstructed luma picture, and a reconstructed picture with chroma samples may be referred to as a reconstructed chroma picture. A combination of the reconstructed luma picture and the reconstructed chroma picture may be referred to as a reconstructed picture. The reconstructed luma picture may be generated based on the forward mapping process. For example, if an inter prediction is applied to a current block, a forward mapping is applied to a luma prediction sample derived based on a (reconstructed) luma sample in a reference picture. Because the (reconstructed) luma sample in the reference picture is generated based on the inverse mapping process, the forward mapping may be applied to the luma prediction sample thus a mapped (reshaped) luma prediction sample can be derived. The forward mapping process may be performed based on a piecewise function index of the luma prediction sample. The piecewise function index may be derived based on the value of the luma prediction sample or the value of the luma sample in the reference picture used for inter prediction. If an intra prediction (or an intra block copy (IBC)) is applied to the current block, the forward mapping is not necessary because the inverse mapping process has not applied to the reconstructed samples in the current picture yet. A (reconstructed) luma sample in the reconstructed luma picture is generated based on the mapped luma prediction sample and a corresponding luma residual sample.

The reconstructed chroma picture may be generated based on the chroma scaling process. For example, a (reconstructed) chroma sample in the reconstructed chroma picture may be derived based on a chroma prediction sample and a chroma residual sample ($c_{res}$) in a current block. The chroma residual sample ($c_{res}$) is derived based on a (scaled) chroma residual sample ($c_{resScale}$) and a chroma residual scaling factor (cScaleInv may be referred to as varScale) for the current block. The chroma residual scaling factor may be calculated based on reshaped luma prediction sample values for the current block. For example, the scaling factor may be calculated based on an average luma value ave($Y'_{pred}$) of the reshaped luma prediction sample values $Y'_{pred}$. For a reference, in FIG. 6, the (scaled) chroma residual sample derived based on the inverse transform/dequantization may be referred to as $c_{resScale}$, and the chroma residual sample derived by performing the (inverse) scaling process to the (scaled) chroma residual sample may be referred to as $c_{res}$.

Figure 7:
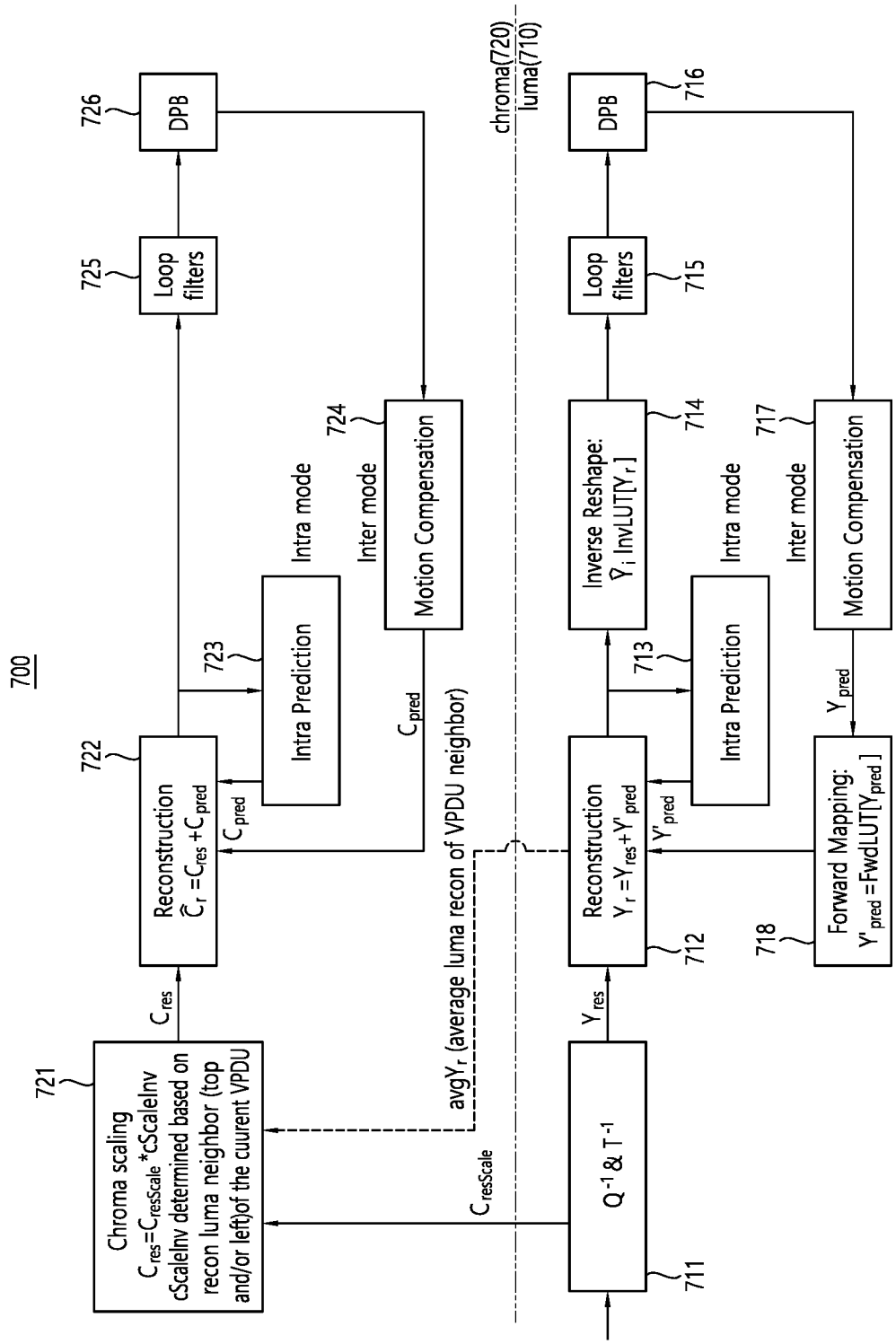
FIG. 7 illustrates an LMCS structure according to another embodiment of the present document.

FIG. 7 illustrates an LMCS structure according to another embodiment of the present document. FIG. 7 is described with reference to FIG. 6. Here, the difference between the LMCS structure 700 of FIG. 7 and the LMCS structure 600 of FIG. 6 is mainly described. The in-loop mapping part 710 and the luma-dependent chroma residual scaling part 720 of FIG. 7 may operate the same as (similarly to) the in-loop mapping part 610 and the luma-dependent chroma residual scaling part 620 of FIG. 6.

Referring to FIG. 7, a chroma residual scaling factor may be derived based on luma reconstructed samples. In this case, an average luma value (avgYr) may be obtained (derived) based on the neighboring luma reconstructed samples outside the reconstructed block, not the inner luma reconstructed samples of the reconstructed block, and the chroma residual scaling factor is derived based on the average luma value (avgYr). Here, the neighboring luma reconstructed samples may be neighboring luma reconstructed samples of the current block, or may be neighboring luma reconstructed samples of virtual pipeline data units (VPDUs) including the current block. For example, when intra prediction is applied to the target block, reconstructed samples may be derived based on prediction samples which are derived based on the intra prediction. In the other example, when inter prediction is applied to the target block, the forward mapping is applied to prediction samples which are derived based on the inter prediction, and reconstructed samples are generated (derived) based on the reshaped (or forward mapped) luma prediction samples.

The video/image information signaled through the bitstream may include LMCS parameters (information on LMCS). LMCS parameters may be configured as high level syntax (HLS, including slice header syntax) or the like. Detailed description and configuration of the LMCS parameters will be described later. As described above, the syntax tables described in the present document (and the following embodiments) may be configured/encoded at the encoder end and signaled to the decoder end through a bitstream. The decoder may parse/decode information on the LMCS (in the form of syntax elements) in the syntax tables. One or more embodiments to be described below may be combined. The encoder may encode the current picture based on the information about the LMCS and the decoder may decode the current picture based on the information about the LMCS.

The in-loop mapping of luma components may adjust the dynamic range of the input signal by redistributing the codewords across the dynamic range to improve compression efficiency. For luma mapping, a forward mapping (reshaping) function (FwdMap) and an inverse mapping (reshaping) function (InvMap) corresponding to the forward mapping function (FwdMap) may be used. The FwdMap function may be signaled using a piece-wise linear models, for example, the piece-wise linear model may have 16 pieces or bins. The pieces may have the equal length. In one example, the InvMap function does not need to be signalled and is instead derived from the FwdMap function. That is, the inverse mapping may be a function of the forward mapping. For example, the inverse mapping function may be mathematically built as the symmetric function of the forward mapping as reflected by the line y=x.

An in-loop (luma) reshaping may be used to map input luma values (samples) to altered values in the reshaped domain. The reshaped values may be coded and then mapped back into the original (un-mapped, un-reshaped) domain after reconstruction. To compensate for the interaction between the luma signal and the chroma signal, chroma residual scaling may be applied. In-loop reshaping is done by specifying high level syntax for the reshaper model. The reshaper model syntax may signal a piece-wise linear model (PWL model). For example, the reshaper model syntax may signal a PWL model with 16 bins or pieces of equal lengths. A forward lookup table (FwdLUT) and/or an inverse lookup table (InvLUT) may be derived based on the piece-wise linear model. For example, the PWL model pre-computes the 1024-entry forward (FwdLUT) and inverse (InvLUT) look up tables (LUT)s. As an example, when the forward lookup table FwdLUT is derived, the inverse lookup table InvLUT may be derived based on the forward lookup table FwdLUT. The forward lookup table FwdLUT may map the input luma values Yi to the altered values Yr, and the inverse lookup table InvLUT may map the altered values Yr to the reconstructed values Y'i. The reconstructed values Y'i may be derived based on the input luma values Yi.

A sequence parameter set (SPS) of an encoder and a decoder according to an embodiment of the present document may include the syntax of Table 1 below. The syntax of Table 1 may include sps_reshaper_enabled_flag as a tool enabling flag. Here, sps_reshaper_enabled_flag may be used to specify whether the reshaper is used in a coded video sequence (CVS). That is, sps_reshaper_enabled_flag may be a flag for enabling reshaping in the SPS. In one example, the syntax of Table 1 may be a part of the SPS included in the CVS of FIG. 5.

TABLE 1

|  | Descriptor |
| --- | --- |
| seq_parameter_set_rbsp( ) { | |
|   sps_seq_parameter_set_id | ue(v) |
|   ... | |
|   sps_reshaper_enabled_flag | u(1) |
|   rbsp_trailing_bits( ) | |
| } | |

In addition, the tile group header of the encoder and the decoder according to an embodiment of the present document may include the syntax of Table 2 below. Table 2 may include reshaper data in the tile group header. Here, the tile group header may be referred to as a slice header. In one example, the syntax of Table 2 may be a part of a tile group header included in the CVS of FIG. 5.

TABLE 2

|  | Descriptor |
| --- | --- |
| tile_group_header( ) { | |
|   tile_group_pic_parameter_set_id | ue(v) |
|   ... | |
|   if( num_tiles_in_tile_group_minus1 > 0 ) { | |
|     offset_len_minus1 | ue(v) |
|     for( i = 0; i < num_tiles_in_tile_group_minus1, i++ ) | |
|       entry_point_offset_minus1[ i ] | u(v) |
|   } | |
|   if ( sps_reshaper_enabled_flag ) { | |
|     tile_group_reshaper_model_present_flag | u(1) |
|     if ( tile_group_reshaper_model_present_flag ) | |
|       tile_group_reshaper_model ( ) | |
|     tile_group_reshaper_enable_flag | u(1) |

TABLE 2-continued

| | Descriptor |
|---|---|
| if ( tile_group_reshaper_enable_flag && <br> (!( qtbtt_dual_tree_intra_flag <br> && tile_group_type == I ) ) ) <br>     tile_group_reshaper_chroma_residual_scale_flag | u(1) |
| } <br> byte_alignment( ) <br> } | |

The syntax of Table 2 includes tile_group_reshaper_model_present_flag, tile_group_reshaper_enabled_flag, and tile_group_reshaper_chroma_residual_scale_flag as syntax elements. Hereinafter, each component will be described in detail.

The tile_group_reshaper_model_present_flag may be information related to whether tile_group_reshaper_model( ) is present. Here, tile_group_reshaper_model( ) may literally be referred to as reshaper (model) information. For example, if tile_group_reshaper_model_present_flag is 1 (or true), it may indicate that tile_group_reshaper_model( ) is present in the tile group header. When tile_group_reshaper_model_present_flag is 0 (or false), it may indicate that tile_group_reshaper_model( ) is not present in the tile group header. If the tile_group_reshaper_model_present_flag is not present, it may be inferred to be 0 (or false). The tile_group_reshaper_model( ) will be described in detail together with Tables 4 or 6 to be described later.

The tile_group_reshaper_enabled_flag may be information related to whether the reshaper is enabled. It may be determined (derived) whether the tile_group_reshaper_enabled_flag reshaper is enabled (or disabled) for the current tile group. For example, if tile_group_reshaper_enabled_flag is 1 (or true), it may indicate that the reshaper is enabled in the current tile group. If the tile_group_reshaper_enabled_flag is 0 (or false), it may indicate that the reshaper is not enabled in the current tile group. If the tile_group_reshaper_enabled_flag is not present, it may be inferred to be 0 (or false).

The tile_group_reshaper_chroma_residual_scale_flag may be information related to whether chroma residual signaling is enabled. For example, when tile_group_reshaper_chroma_residual_scale_flag is 1 (or true), it may indicate that chroma residual signaling is enabled in the current tile group. When tile_group_reshaper_chroma_residual_scale_flag is 0 (or false), it may indicate that chroma residual signaling is enabled in the current tile group. If tile_group_reshaper_chroma_residual_scale_flag is not present, it may be inferred to be 0 (or false).

As one example, once sps_reshaper_enabled_flag in Table 1 is parsed, the tile group header may parse additional data (i.e., information included in Table 2 above) which is used to construct lookup tables (FwdLUT and/or InvLUT). In order to do this, the status of the SPS reshaper flag (sps_reshaper_enabled_flag) may be first checked in the tile group header. When sps_reshaper_enabled_flag is true (or 1), an additional flag, i.e., tile_group_reshaper_model_present_flag may be parsed. The purpose of the tile_group_reshaper_model_present_flag may be to indicate the presence of the reshaping model. For example, when tile_group_reshaper_model_present_flag is true (or 1), it may be indicated that the reshaper is present for the current tile group. When tile_group_reshaper_model_present_flag is false (or 0), it may be indicated that the reshaper is not present for the current tile group.

If the reshaper is present and the reshaper is enabled in the current tile group, the reshaper model (i.e., tile_group_reshaper_model( )) may be processed. Further to this, an additional flag, tile_group_reshaper_enable_flag may also be parsed. The tile_group_reshaper_enable_flag may indicate whether the reshaping model is used for the current tile group. For example, if tile_group_reshaper_enable_flag is 0 (or false), it may be indicated that the reshaping model is not used for the current tile group. If tile_group_reshaper_enable_flag is 1 (or true), it may be indicated that the reshaping model is used for the current tile group.

As one example, tile_group_reshaper_model_present_flag may be true (or 1) and tile_group_reshaper_enable_flag may be false (or 0). This means that the reshaping model is present but not used in the current tile group. In this case, the reshaping model can be used in the future tile groups. As another example, tile_group_reshaper_enable_flag may be true (or 1) and tile_group_reshaper_model_present_flag may be false (or 0). In such a case, the decoder uses the reshaper from the previous initialization.

When the reshaping model (i.e., tile_group_reshaper_model( )) and tile_group_reshaper_enable_flag are parsed, it may be determined (evaluated) whether conditions necessary for chroma scaling are present. The above conditions includes a condition 1 (the current tile group has not been intra-coded) and/or a condition 2 (the current tile group has not been partitioned into two separate coding quad tree structures for luma and chroma, i.e. the block structure for The current tile group/slice is not a dual tree structure). If the condition 1 and/or the condition 2 are true and/or tile_group_reshaper_enable_flag is true (or 1), then tile_group_reshaper_chroma_residual_scale_flag may be parsed. When tile_group_reshaper_chroma_residual_scale_flag is enabled (if 1 or true), it may be indicated that chroma residual scaling is enabled for the current tile group. When tile_group_reshaper_chroma_residual_scale_flag is disabled (if 0 or false), it may be indicated that chroma residual scaling is disabled for the current tile group.

Figure 17:
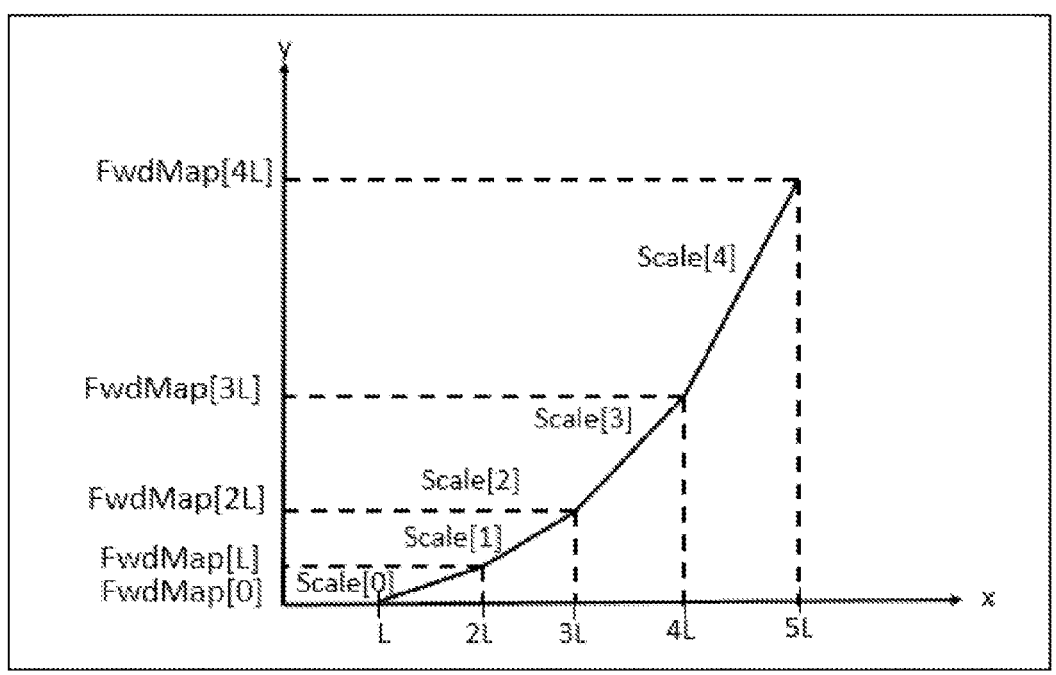
FIG. 17 shows Table 3 that shows a graph representing an exemplary forward mapping.

The purpose of the tile group reshaping model is to parse the data that would be necessary to construct the lookup tables (LUTs). These LUTs are constructed on the idea that the distribution of an allowable range of luma values can be divided into a plurality of bins (ex. 16 bins) which can be represented using a set of 16 PWL system of equations. Therefore, any luma value that lies within a given bin can be mapped to an altered luma value. FIG. 17 shows Table 3 that shows a graph representing an exemplary forward mapping. In Table 3, only five bins are shown by way of example.

Referring to Table 3, the x-axis represents input luma values, and the y-axis represents altered output luma values. The x-axis is divided into 5 bins or slices, each bin of length L. That is, the five bins mapped to the altered luma values have the same length. The forward lookup table (FwdLUT) may be constructed using data (i.e., reshaper data) available from the tile group header, and thus mapping may be facilitated.

In one embodiment, output pivot points associated with the bin indices may be calculated. The output pivot points may set (mark) the minimum and maximum boundaries of the output range of the luma codeword reshaping. The calculation process of the output pivot points may be performed by computing a piecewise cumulative distribution function (CDF) of the number of codewords. The output pivot range may be sliced based on the maximum number of bins to be used and the size of the lookup table (FwdLUT or InvLUT). As one example, the output pivot range may be sliced based on a product between the maximum number of bins and the size of the lookup table (size of LUT*maximum number of bin indices). For example, if the product between the maximum number of bins and the size of the lookup table is 1024, the output pivot range may be sliced into 1024 entries. This serration of the output pivot range may be performed (applied or achieved) based on (using) a scaling factor. In one example, the scaling factor may be derived based on Equation 1 below.

$$SF = (y2 - y1) * (1 << FP\_PREC) + c \qquad [\text{Equation 1}]$$

In Equation 1, SF denotes a scaling factor, and y1 and y2 denote output pivot points corresponding to each bin. Also, FP_PREC and c may be predetermined constants. The scaling factor determined based on Equation 1 may be referred to as a scaling factor for forward reshaping.

In another embodiment, with respect to inverse reshaping (inverse mapping), for a defined range of the bins to be used (i.e., from reshaper_model_min_bin_idx to reshape_model_max_bin_idx), the input reshaped pivot points which correspond to the mapped pivot points of the forward LUT and the mapped inverse output pivot points (given by bin index under consideration*number of initial codewords) are fetched. In another example, the scaling factor SF may be derived based on Equation 2 below.

$$SF = (y2 - y1) * (1 << FP\_PREC)/(x2 - x1) \qquad [\text{Equation 2}]$$

In Equation 2, SF denotes a scaling factor, x1 and x2 denote input pivot points, and y1 and y2 denote output pivot points corresponding to each piece (bin) (output pivot points of the inverse mapping). Here, the input pivot points may be pivot points mapped based on a forward lookup table (FwdLUT), and the output pivot points may be pivot points inverse-mapped based on an inverse lookup table (InvLUT). Also, FP_PREC may be a predetermined constant value. FP_PREC of Equation 2 may be the same as or different from FP_PREC of Equation 1. The scaling factor determined based on Equation 2 may be referred to as a scaling factor for inverse reshaping. During inverse reshaping, partitioning of input pivot points may be performed based on the scaling factor of Equation 2. The scaling factor SF is used to slice the range of input pivot points. Based on the partitioned input pivot points, bin indices in the range from 0 to the minimum bin index (reshaper_model_min_bin_idx) and/or from the minimum bin index (reshaper_model_min_bin_idx) to the maximum bin index (reshape_model_max_bin_idx) are assigned the pivot values that correspond to the minimum and maximum bin values.

Table 4 below shows the syntax of the reshaper model according to an embodiment. Here, the reshaper model has been exemplarily described as a tile group reshaper, but the present document is not necessarily limited by this embodiment. For example, the tile group reshaper model may be referred to as a slice reshaper model.

TABLE 4

| | Descriptor |
|---|---|
| tile_group_reshaper_model ( ) { | |
|   reshaper_model_min_bin_idx | ue(v) |
|   reshaper_model_delta_max_bin_idx | ue(v) |

TABLE 4-continued

| | Descriptor |
|---|---|
|   reshaper_model_bin_delta_abs_cw_prec_minus1 | ue(v) |
|   for ( i = reshaper_model_min_bin_idx; i <= reshaper_model_max_bin_idx; i++ ) { | |
|     reshape_model_bin_delta_abs_CW[ i ] | u(v) |
|     if ( reshaper_model_bin_delta_abs_CW[ i ] ) > 0 ) | |
|       reshaper_model_bin_delta_sign_CW_flag[ i ] | u(1) |
|     } | |
| } | |

The syntax of Table 4 includes reshape_model_min_bin_idx, reshape_model_delta_max_bin_idx, reshaper_model_bin_delta_abs_cw_prec_minus1, reshape_model_bin_delta_abs_CW[i], and reshaper_model_bin_delta_sign_CW as elements. Hereinafter, each syntax element will be described in detail.

reshape_model_min_bin_idx indicates the minimum bin (or piece) index used in the reshaper configuring (constructing) process. The value of reshape_model_min_bin_idx may range from 0 to MaxBinIdx. For example, MaxBinIdx may be 15.

In an embodiment, the tile group reshaper model may preferentially parse two indices (or parameters), reshaper_model_min_bin_idx and reshaper_model_delta_max_bin_idx. A maximum bin index (reshaper_model_max_bin_idx) may be derived (determined) based on these two indices. The reshape_model_delta_max_bin_idx may represent the value derived by subtracting the actual maximum bin index (reshape_model_max_bin_idx), used in the reshaper configuration process, from the allowed maximum bin index MaxBinIdx. A value of the maximum bin index (reshaper_model_max_bin_idx) may range from 0 to MaxBinIdx. For example, MaxBinIdx may be 15. As an example, the value of reshape_model_max_bin_idx may be derived based on Equation 3 below.

$$\text{reshape\_model\_max\_bin\_idx} = \qquad [\text{Equation 3}]$$
$$MaxBinIdx - \text{reshape\_model\_data\_max\_bin\_idx}.$$

The maximum bin index reshaper_model_max_bin_idx may be greater than or equal to the minimum bin index reshaper_model_min_bin_idx. The minimum bin index may be referred to as a minimum allowed bin index or a allowed minimum bin index, and the maximum bin index may also be referred to as a maximum allowed bin index or a allowed maximum bin index.

If the maximum bin index (rehape_model_max_bin_idx) is derived, the syntax element reshaper_model_bin_delta_abs_cw_prec_minus1 may be parsed. The number of bits used to represent the syntax reshape_model_bin_delta_abs_CW[i] may be determined based on reshaper_model_bin_delta_abs_cw_prec_minus1. For example, the number of bits used to represent reshape_model_bin_delta_abs_CW[i] may be equal to 1 plus reshaper_model_bin_delta_abs_cw_prec_minus1.

reshape_model_bin_delta_abs_CW[i] may indicate information related to the absolute delta codeword value (absolute value of the delta codeword) of the i-th bin. In one example, if the absolute delta codeword value of the i-th bin is greater than 0, reshaper_model_bin_delta_sign_CW_flag [i] may be parsed. A sign of reshape_model_bin_delta_abs_CW[i] may be determined based on reshaper_model_bin_delta_sign_CW_flag[i]. In one example, if reshape_model_ bin_delta_sign_CW_flag[i] is 0 (or false), the corresponding variable RspDeltaCW[i] may be a positive sign. In other cases (if reshaper_model_bin_delta_sign_CW_flag[i] is not 0, if reshape_model_bin_delta_sign_CW_flag[i] is 1 (or true)), the corresponding variable RspDeltaCW[i] may be a negative sign. If reshape_model_bin_delta_sign_CW_flag[i] is not present, it may be inferred to be equal to 0 (or false).

In an embodiment, the variable RspDeltaCW[i] may be derived based on reshape_model_bin_delta_abs_CW[i] and reshape_model_bin_delta_sign_CW_flag[i] described above. RspDeltaCW[i] may be referred to as a value of a delta codeword. For example, RspDeltaCW[i] may be derived based on Equation 4 below.

$$RspDeltaCW[i] = \qquad \text{[Equation 4]}$$
$$(1 - 2 * reshape\_model\_bin\_delta\_sign\_CW[i]) *$$
$$reshape\_model\_bin\_delta\_abs\_CW[i]$$

In Equation 4, reshape_model_bin_delta_sign_CW[i] may be information related to a sign of RspDeltaCW[i]. For example, reshape_model_bin_delta_sign_CW[i] may be the same as reshaper_model_bin_delta_sign_CW_flag[i] described above. Here, i may be in a range from a minimum bin index (reshaper_model_min_bin_idx) to a maximum bin index (reshape_model_max_bin_idx).

In the other embodiment, the variable RspDeltaCW[i] is derived based on reshape_model_bin_delta_sign_CW_flag [i], modified (scaled, coded) reshape_model_bin_delta_abs_CW[i], and luma bit depth (BitDepthY). In one example, the modified reshape_model_bin_delta_abs_CW[i] may be derived based on Equation 5 below.

$$reshape\_model\_bin\_dela\_abs\_CW[i] = \qquad \text{[Equation 5]}$$
$$abs(RspDeltaCW[i]) >> (BitDepth_Y - 10)$$

In Equation 5, RspDeltaCW[i] may be bit-shifted (i.e., right bit-shifted) based on the luma bit depth BitDepthY. Here, RspDeltaCW[i] may be derived based on Equation 4 above. The maximum number of bits required for RspDeltaCW[i] may be reduced by (BitDepthY−10). In one example, the derivation of the modified reshape_model_ bin_delta_abs_CW[i] based on Equation 5 may be performed by the decoding apparatus (in the decoding process). RspDeltaCW[i], which is based on the modified reshape_model_bin_delta_abs_CW[i] and the luma bit depth BitDepthY, may be derived based on Equation 6 below.

$$RspDeltaCW[i] = \qquad \text{[Equation 6]}$$
$$(1 - 2 * reshape\_model\_bin\_delta\_sign\_CW[i]) *$$
$$(reshape\_model\_max\_bin\_delta$$
$$\_abs\_CW[i] << (BitDepth_Y - 10))$$

In the following, Equation 6 is described based on the difference from Equation 4 above. In Equation 6, reshape_model_bin_delta_abs_CW[i] may be bit-shifted (i.e., left bit-shifted) based on the luma bit depth BitDepthY. In one example, the derivation of RspDeltaCW[i] based on Equation 6 may be performed by the encoding apparatus (in the encoding process). In Equations 5 and 6, a condition (BitDepthY>10) for the luma bit depth may be satisfied.

In the embodiment described with Equation 4, overhead is occurred at high bit depths. The overhead at high bit depth is described based on Table 5 below. Table 5 shows RspDeltaCW[i], RspCW[i], and ReshapePivot[i] for two luma bit depths 10 and 12 when indices are 1 to 14. Table 5 is an example of a case where reshaper_mode_min_bin_idx is 1, reshaper_mode_max_bin_idx is 14, and MaxBinIdx+1=16.

TABLE 5

| | BitDepth$_Y$ = 10 | | | BitDepth$_Y$ = 12 | | |
| Idx | RspDeltaCW [i] | RspCW [i] | ReshapePivot [i] | RspDeltaCW [i] | RspCW [i] | ReshapePivot [i] |
| --- | --- | --- | --- | --- | --- | --- |
| 1 | 2 | 66 | 66 | 8 | 264 | 264 |
| 2 | 2 | 66 | 132 | 8 | 264 | 528 |
| 3 | 2 | 66 | 198 | 8 | 264 | 792 |
| 4 | 2 | 66 | 264 | 8 | 264 | 1056 |
| 5 | 2 | 66 | 330 | 8 | 264 | 1320 |
| 6 | 5 | 69 | 399 | 20 | 276 | 1596 |
| 7 | 8 | 72 | 471 | 32 | 288 | 1884 |
| 8 | 5 | 69 | 540 | 20 | 276 | 2160 |
| 9 | 2 | 66 | 606 | 8 | 264 | 2424 |
| 10 | 7 | 66 | 672 | 8 | 264 | 2688 |
| 11 | 2 | 66 | 738 | 8 | 264 | 2952 |
| 12 | 7 | 66 | 804 | 8 | 264 | 3216 |
| 13 | 2 | 66 | 870 | 8 | 264 | 3480 |
| 14 | −1 | 63 | 933 | −4 | 252 | 3732 |

In the above example, the number of bits required for RspDeltaCW[i] when BitDepthY=12 is 4, and the number of bits required for RspDeltaCW[i] when BitDepthY=10 is 6. Therefore, roughly, in order to signal RspDeltaCW[i] in the case of BitDepthY=10, additional bits are needed more than in RspDeltaCW[i] when BitDepthY=12. In Table 5, it can be observed that RspDeltaCW[i] when BitDepthY=12 is a multiple (i.e., 4 times) of RspDeltaCW[i] when BitDepthY=10. Therefore, it is necessary to modify RspDeltaCW[i] and reshape_model_bin_delta_abs_CW depending on the luma bit depth BitDepthY.

According to the embodiment described together with Equations 5 and 6 above, the actual signaled value of reshape_model_bin_delta_abs_CW can be modified (scaled, encoded) and syntax elements at high bit depths can be modified. The overhead caused by signaling (signaling overhead for high bit depth) can be reduced.

In another embodiment, the reshaper model may be based on the syntax included in Table 6 below. Like Table 4, the syntax of Table 6 is described as a tile group reshaper model, but the present document is not necessarily limited in this way. For example, a tile group reshaper model may be referred to as a slice reshaper model.

TABLE 6

| | Descriptor |
|---|---|
| tile_group_reshaper_model ( ) { | |
|   reshaper_model_min_bin_idx | ue(v) |
|   reshaper_model_delta_max_bin_idx | ue(v) |
|   reshaper_model_bin_delta_abs_cw_prec_minus1 | ue(v) |
|   reshaper_is_linear | u(1) |
|   If (reshaper_is_linear) | |
|     reshape_model_bin_delta_abs_CW | u(v) |
|     if ( reshaper_model_bin_delta_abs_CW ) > 0 ) | |
|       reshaper_model_bin_delta_sign_CW_flag | u(1) |
|   else { | |
|     for ( i = reshaper_model_min_bin_idx; i <= reshaper_model_max_bin_idx; i++ ) { | |
|       reshape_model_bin_delta_abs_CW [ i ] | u(v) |
|       if ( reshaper_model_bin_delta_abs_CW[ i ] ) > 0 ) | |
|         reshaper_model_bin_delta_sign_CW_flag[ i ] | u(1) |
|     } | |
|   } | |
| } | |

In the description related to Table 6 below, descriptions of syntax elements already described together with Table 4 are omitted. In the syntax of Table 6, the syntax element reshaper_is_linear may be signaled. reshaper_is_linear may be a syntax element signaling a linear reshaper (i.e., a reshaper having only one piece (or bin)). In one example, detailed information or semantics that the syntax element reshaper_is_linear may represent may be as shown in Table 7 below.

TABLE 7 reshaper_is_linear equal to 1 specifies that reshaper is linear.
If reshaper_is_linear equal to 1, only one set of
reshape_model_bin_delta_abs_CW and
reshaper_model_bin_delta_sign_CW_flag are received.

For example, when reshaper_is_linear is 1 (or true), it may be indicated that the reshaper is linear. If the reshaper has only one piece (or bin), only one reshape_model_bin_delta_abs_CW and/or one reshape_model_bin_delta_sign_CW_flag may be signaled. A variable RspDeltaCW[i] may be derived based on the above-described reshape_model_bin_delta_abs_CW and reshape_model_bin_delta_sign_CW_flag. For example, RspDeltaCW[i] may be derived based on Equation 7 below.

$$RspDeltaCW[i] = (1 - 2*\text{reshape\_model\_bin\_delta\_sign\_CW}) * \text{reshape\_model\_bin\_delta\_abs\_CW} \quad \text{[Equation 7]}$$

In Equation 7, reshape_model_bin_delta_sign_CW may be information related to a sign of RspDeltaCW[i]. For example, reshape_model_bin_delta_sign_CW may be the same as reshaper_model_bin_delta_sign_CW_flag described above. Here, i may be in a range from a minimum bin index (reshaper_model_min_bin_idx) to a maximum bin index (reshaper_model_max_bin_idx). Thus, if the reshaper is linear, the values RspDeltaCW[i] of the delta codewords may be derived equal irrespective of i (for all i).

When reshaper_is_linear is 0 (or false), it may be indicated that the reshaper is piecewise linear (not linear). In this case, the reshaping related information may include information on an absolute value and a sign of a delta codeword for each of a plurality of bins. The piecewise linear reshaper (non-linear reshaper) has a plurality of bins (or pieces), and a plurality of reshape_model_bin_delta_abs_CW and/or a plurality of reshape_model_bin_delta_sign_CW flags may be signaled. Accordingly, an index may be required and reshape_model_bin_delta_abs_CW[i] and/or reshape_model_bin_delta_sign_CW_flag[i] may be expressed on the syntax. In the piecewise reshaper (non-linear reshaper), the derivation of RspDeltaCW[i] based on reshape_model_bin_delta_abs_CW[i] and/or reshape_model_bin_delta_sign_CW_flag[i] may follow the embodiment described with Table 4.

According to the embodiment described together with Tables 6 and 7, the option of signaling the linear reshaper is provided, and the overhead (signaling overhead) occurred by signaling RspDeltaCW[i] for all bins can be reduced, And signaling of the reshaper may occur more frequently.

A variable (or array) RspCW[i] may be derived based on RspDeltaCW[i]. Here, RspCW[i] may indicate the number of codewords allocated (distributed) to the i-th bin. That is, the number of codewords allocated (distributed) to each bin may be stored in an array form. In one example, if i is smaller than the reshaper_model_min_bin_idx or larger than reshaper_model_max_bin_idx (i<reshaper_model_min_bin_idx or reshaper_model_max_bin_idx<i), RspCW[i] may be equal to 0. Otherwise (if i is greater than or equal to reshaper_model_min_bin_idx described above and less than or equal to reshaper_model_max_bin_idx (reshaper_model_min_bin_idx<=i<=reshaper_model_max_bin_idx), RspCW[i] may be derived based on the above-described RspDeltaCW[i], the luma bit depth (BitDepthY), and/or MaxBinIdx. In this case, for example, RspCW[i] may be derived based on Equation 8 below.

$$RspCW[i] = OrgCW + RspDeltaCW[i] \quad \text{[Equation 8]}$$

In Equation 8, OrgCW may be a predetermined value, for example, may be determined based on Equation 9 below.

$$OrgCW = (1 << BitDepth_Y)/(MaxBinIdx + 1) \quad \text{[Equation 9]}$$

In Equation 9, BitDepthY is the luma bit depth, and MaxBinIdx represents the allowable maximum bin index. In one example, if BitDepthY is 10, RspCW[i] may have a value from 32 to 2*OrgCW−1.

A variable InputPivot[i] may be derived based on the OrgCW. For example, InputPivot[i] may be derived based on Equation 10 below.

$$InputPivot[i] = i * OrgCW \quad \text{[Equation 10]}$$

Variables ReshapePivot[i], ScaleCoef[i], and/or InvScaleCoeff[i] may be derived based on the above-described RspCW[i], InputPivot[i], and/or OrgCW, for example, ReshapePivot[i]], ScaleCoef[i], and/or InvScaleCoeff[i] may be derived based on Table 8 below.

TABLE 8

```
shiftY = 14
ReshapePivot[ 0 ] = 0;
for( i = 0; i <= MaxBinIdx ; i++) {
  ReshapePivot[ i + 1 ] = ReshapePivot[ i ] + RspCW[ i ]
  ScaleCoef[ i ] = ( RspCW[ i ] * (1 << shiftY) + (1 << (Log2(OrgCW) − 1))) >>
(Log2(OrgCW))
  if ( RspCW[ i ] == 0 )
    InvScaleCoeff[ i ] = 0
  else
    InvScaleCoeff[ i ] = OrgCW * (1 << shiftY) / RspCW[ i ]
}
```

In Table 8, the for loop syntax in which i increases from 0 to MaxBinIdx may be used, and shiftY may be a predetermined constant for bit shifting. Whether InvScaleCoeff[i] is derived based on RspCW[i] may be determined based on a conditional clause according to whether RspCW[i] is 0.

ChromaScaleCoef[i] for deriving the chroma residual scaling factor may be derived based on Table 9 below.

TABLE 9

```
ChromaResidualScaleLut[64] = {16384, 16384, 16384, 16384, 16384, 16384, 16384,
8192, 8192, 8192, 8192, 5461, 5461, 5461, 5461, 4096, 4096, 4096, 4096, 3277, 3277,
3277, 3277, 2731, 2731 2731, 2731, 2341, 2341,2341, 2048, 2048, 2048, 1820, 1820,
1820, 1638, 1638, 1638, 1638, 1489, 1489, 1489, 1489, 1365, 1365, 1365, 1365, 1260,
1260, 1260, 1260, 1170, 1170, 1170, 1170, 1092, 1092, 1092, 1092, 1024, 1024, 1024,
1024};
shiftC = 11
- if ( RspCW[ i ] == 0 )
    ChromaScaleCoef [ i ] = (1 << shiftC)
- Otherwise (RspCW[ i ] != 0),
    ChromaScaleCoef[ i ] = ChromaResidualScaleLut[RspCW[ i ] >> 1]
```

In Table 9, shiftC may be a predetermined constant for bit shifting. Referring to Table 9, whether ChromaScaleCoef[i] is derived based on the array ChromaResidualScaleLut may be determined based on a conditional clause according to whether RspCW[i] is 0. Here, ChromaResidualScaleLut may be a predetermined array. However, the array ChromaResidualScaleLut is merely exemplary, and the present embodiment is not necessarily limited by Table 9.

A method for deriving the i-th variables has been described above. The i+1-th variables may be based on ReshapePivot[i+1], and for example, ReshapePivot[i+1] may be derived based on Equation 11.

$$ReshapePivot[i + 1] = ReshapePivot[i] + RspCW[i] \quad \text{[Equation 11]}$$

In Equation 11, RspCW[i] may be derived based on Equations 8 and/or 9 described above. Luma mapping may be performed based on the above-described embodiments and examples, and the above-described syntax and elements included therein may be merely exemplary representations, and embodiments are not limited by the above-mentioned tables or equations. Hereinafter, a method of performing chroma residual scaling (scaling of chroma components of residual samples) based on luma mapping is described.

The (luma-dependent) chroma residual scaling is to compensate for the interaction between luma samples and corresponding chroma samples. For example, whether chroma residual scaling is enabled or not may be signaled at a tile group level or a slice level. In one example, if luma mapping is enabled and dual tree partitioning is not applied to the current tile group, an additional flag may be signaled to indicate whether luma-dependent chroma residual scaling is enabled. In the other example, when luma mapping is not used, or when dual tree partition is used in the current tile group, luma-dependent chroma residual scaling is disabled. In another example, chroma residual scaling may always be disabled for chroma blocks whose area is less than or equal to 4.

The chroma residual scaling may be based on an average value of a corresponding luma prediction block (a luma component of a prediction block to which an intra prediction mode and/or an inter prediction mode is applied). Scaling operations at the encoder end and/or the decoder end may be implemented as a fixed-point integer operation based on Equation 12 below.

$$c' = \text{sign}(c) * ((\text{abs}(c) * s + 2^{CSCALE\_FP\_PREC-1}) \quad \text{[Equation 12]}$$
$$>> CSCALE\_FP\_PREC)$$

In Equation 12 described above, c' may represent the scaled chroma residual sample (scaled chroma component of the residual sample), c may represent the chroma residual sample (chroma component of the residual sample), and s r may represent the chroma residual scaling factor, and CSCALE_FP_PREC may represent a predetermined constant.

Figure 8:
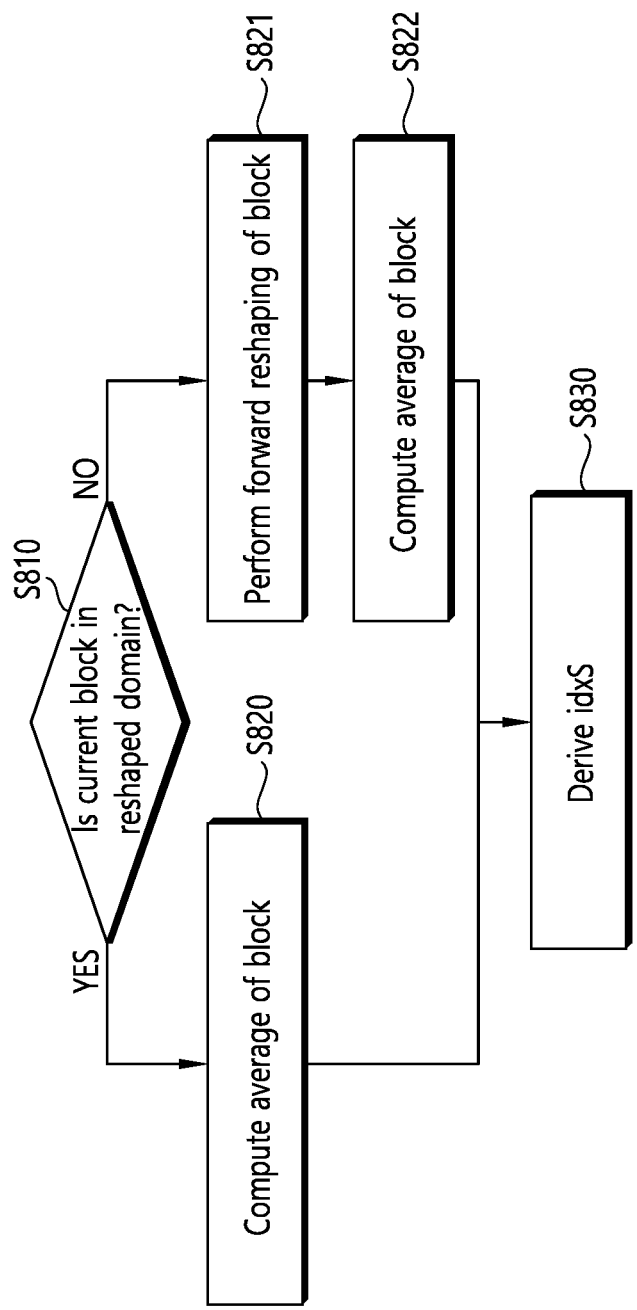
FIG. 8 is a flowchart illustrating a method of deriving a chroma residual scaling index according to an embodiment of the present document.

FIG. 8 is a flowchart illustrating a method of deriving a chroma residual scaling index according to an embodiment of the present document. The method described in conjunction with FIG. 8 may be performed based on FIG. 6, and tables, equations, variables, arrays, and functions described with FIG. 6. This is also the same in FIGS. 9 to 11 below.

In step S810, it may be determined whether the current block belongs to the reshaped domain. When it is determined that the current block belongs to the reshaped domain (if the current block belongs to the reshaped domain), the prediction mode of the current block may be regarded as an intra prediction mode. When it is determined that the current block does not belong to the reshaped domain (if the current block does not belong to the reshaped domain), the prediction mode of the current block may be regarded as an inter prediction mode.

In step S820, when the current block belongs to the reshaped domain (when the prediction mode is the intra prediction mode), the average luma value of the current block (or the average luma value of luma prediction sample values in the current block) may be calculated (derived). That is, the average luma value of the current block already in the reshaped domain is calculated directly.

In step S821, if the current block does not belong to the reshaped domain (when the prediction mode is the inter prediction mode), forward reshaping (forward mapping) may be performed (applied) on the luma prediction sample values of the current block. Through forward reshaping, luma prediction sample values based on the inter prediction mode may be mapped from the original domain to the reshaped domain. In one example, forward reshaping for luma prediction sample values may be performed based on the reshaping model described in conjunction with Table 4 or 6 above.

In operation S822, an average luma value of the forward reshaped (forward mapped) luma prediction sample values may be calculated (derived). That is, an averaging process may be performed on the forward reshaped result.

In operation S830, a chroma residual scaling index may be calculated. When the current block belongs to the reshaped domain (when the prediction mode is the intra prediction mode), the chroma residual scaling index may be calculated based on the average luma value of the luma prediction sample values. When the current block does not belong to the reshaped domain (when the prediction mode is the inter prediction mode), the chroma residual scaling index may be calculated based on an average luma value of forward reshaped luma prediction sample values.

In an embodiment, the chroma residual scaling index may be calculated based on a for loop syntax. Table 10 below shows an exemplary for loop syntax for deriving (calculating) the chroma residual scaling index.

TABLE 10

```
for( idxS = 0, idxFound = 0; idxS <= MaxBinIdx; idxS++ )
{
  if( (S < ReshapePivot[ idxS + 1 ] )
  {
    idxFound = 1
    break;
  }
}
```

In Table 10, idxS represents the chroma residual scaling index, idxS represents an index identifying whether a chroma residual scaling index satisfying the condition of the if statement is obtained, S represents a predetermined constant, and MaxBinIdx represents the maximum allowable bin index. ReshapPivot[idxS+1] may be derived based on Table 8 described above.

Figure 9:
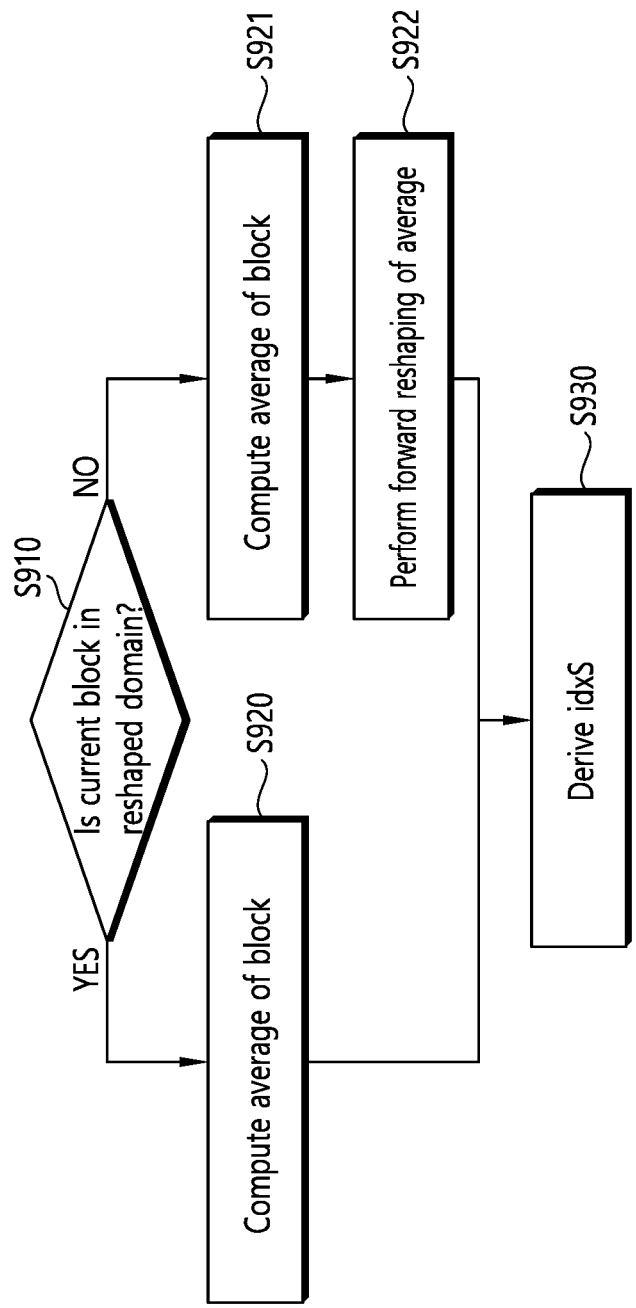
FIG. 9 is a flowchart illustrating a method of deriving a chroma residual scaling index according to the other embodiment of the present document.

FIG. 9 is a flowchart illustrating a method of deriving a chroma residual scaling index according to the other embodiment of the present document. FIG. 9 will be described with reference to FIG. 8. Steps S910 and S920 of FIG. 9 may be substantially the same as steps S810 and S820 of FIG. 8, respectively. In addition, when the current block belongs to the reshaped domain (when the prediction mode is the intra prediction mode), the features described with reference to FIGS. 8 and 9 are substantially the same. In the following, the difference between FIGS. 8 and 9 will be mainly explained.

In operation S921, when the current block does not belong to the reshaped domain (when the prediction mode is the inter prediction mode), an average luma value of luma prediction sample values may be calculated (derived). As such, averaging of samples may be performed prior to forward reshaping. The average luma value of the luma prediction sample values may be referred to as an average luma prediction sample value.

In operation S922, forward reshaping may be performed (applied) on the average luma value (average luma prediction sample value) of the luma prediction sample values. From this, a forward reshaped average luma value can be derived (computed or generated).

In step S930, if the current block does not belong to the reshaped domain (the prediction mode is the inter prediction mode), the chroma residual scaling index may be calculated based on the forward reshaped average luma value (forward reshaped average luma prediction sample value).

Also in this embodiment, as described in conjunction with FIG. 8, the chroma residual scaling index may be calculated based on a for loop syntax. That is, the chroma residual scaling index may be derived (calculated) based on the for loop syntax of Table 10 described above. Calculation of the chroma residual scaling index according to the present embodiment may reduce the number of reshaping (i.e., forward reshaping), and thus may increase inter prediction efficiency.

Figure 10:
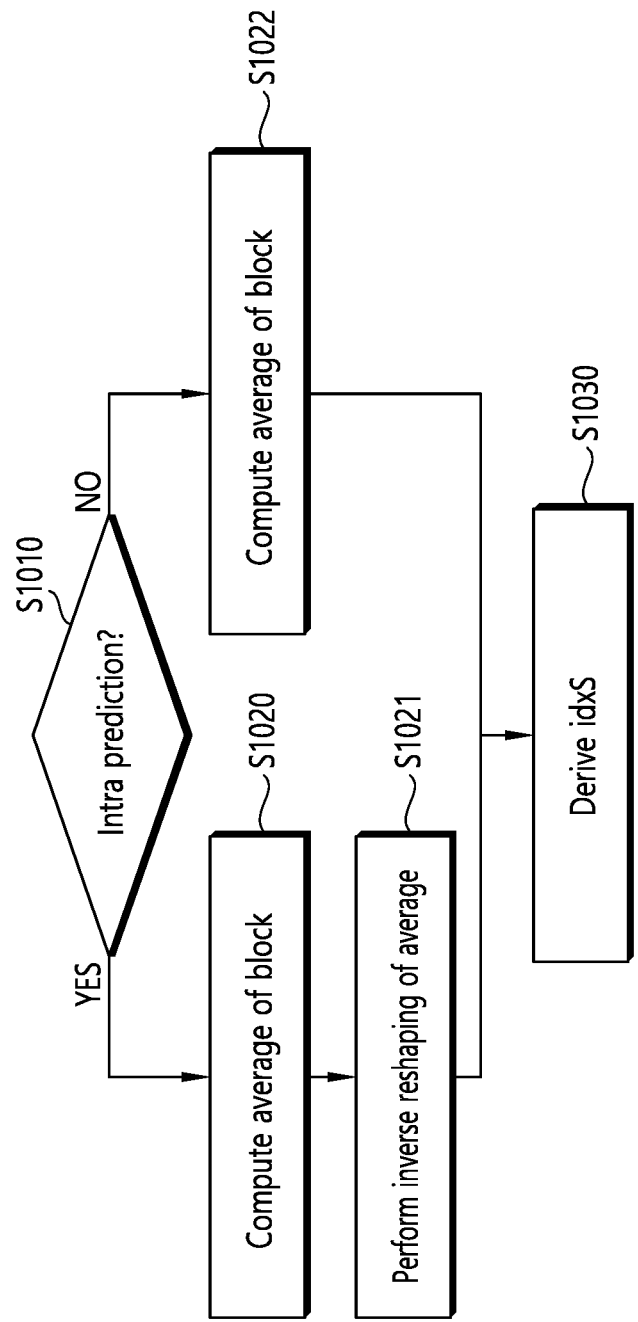
FIG. 10 is a flowchart illustrating a method of deriving a chroma residual scaling index according to the other embodiment of the present document.

FIG. 10 is a flowchart illustrating a method of deriving a chroma residual scaling index according to the other embodiment of the present document. FIG. 10 will be described with reference to FIGS. 8 and 9.

In operation S1010, it may be determined whether the prediction mode of the current block is an intra prediction mode or an inter prediction mode. When the prediction mode of the current block is the intra prediction mode, the current block may be regarded as belonging to the reshaped domain. When the prediction mode of the current block is the inter prediction mode, the current block may be considered to already belong to the original (non-reshaped, non-mapped) domain.

In operation S1020, when the prediction mode of the current block is the intra prediction mode, an average of luma prediction sample values may be calculated (derived). As such, averaging of samples may be performed prior to inverse reshaping.

In operation S1021, inverse reshaping may be performed (applied) on the average luma value (average luma prediction sample value) of the luma prediction sample values. From this, inverse reshaped average luma samples can be derived (computed or generated).

In operation S1022, when the prediction mode of the current block is the inter prediction mode, an average of the current block (or luma prediction sample values of the current block) may be calculated (derived). That is, the average of the current block already in the original domain is calculated directly.

In operation S1030, when the prediction mode of the current block is the intra prediction mode, the chroma residual scaling index may be calculated based on the inverse reshaped average luma value. When the prediction mode of the current block is the inter prediction mode, the chroma residual scaling index may be calculated based on the average luma value.

In the present embodiment, the chroma residual scaling index may be derived (calculated) based on a bit shifting operation instead of the for syntax exemplarily described in FIG. 6. For example, the chroma residual scaling index may be derived based on Equation 13 below using a bit shifting operation.

$$idxS = avgY_{TU} \gg N \qquad \text{[Equation 13]}$$

In Equation 13, idxS denotes the chroma residual scaling index, and $avgY_{TU}$ denotes an average luma value of the inverse reshaped average luma prediction sample values or an average luma value of luma prediction sample values. N is a variable that can be used for bit shifting and may be determined based on the luma bit depth, for example, N may be determined based on Equation 14 below.

$$N = \log 2(OrgCW) \qquad \text{[Equation 14]}$$

In Equation 14, the variable OrgCW may be pre-defined (pre-determined). For example, OrgCW may be determined based on Equation 9 described above. Here, Equations 9 and 14 for determining N are merely exemplary, and the present embodiment is not limited by Equations 9 and 14.

According to this embodiment, a loop operation is not required to obtain the chroma residual scaling index, and only a bit shifting operation is required. That is, the derivation (calculation) of the chroma residual scaling index (or factor) may be simplified, and thus the efficiency of image coding may be increased.

Figure 11:
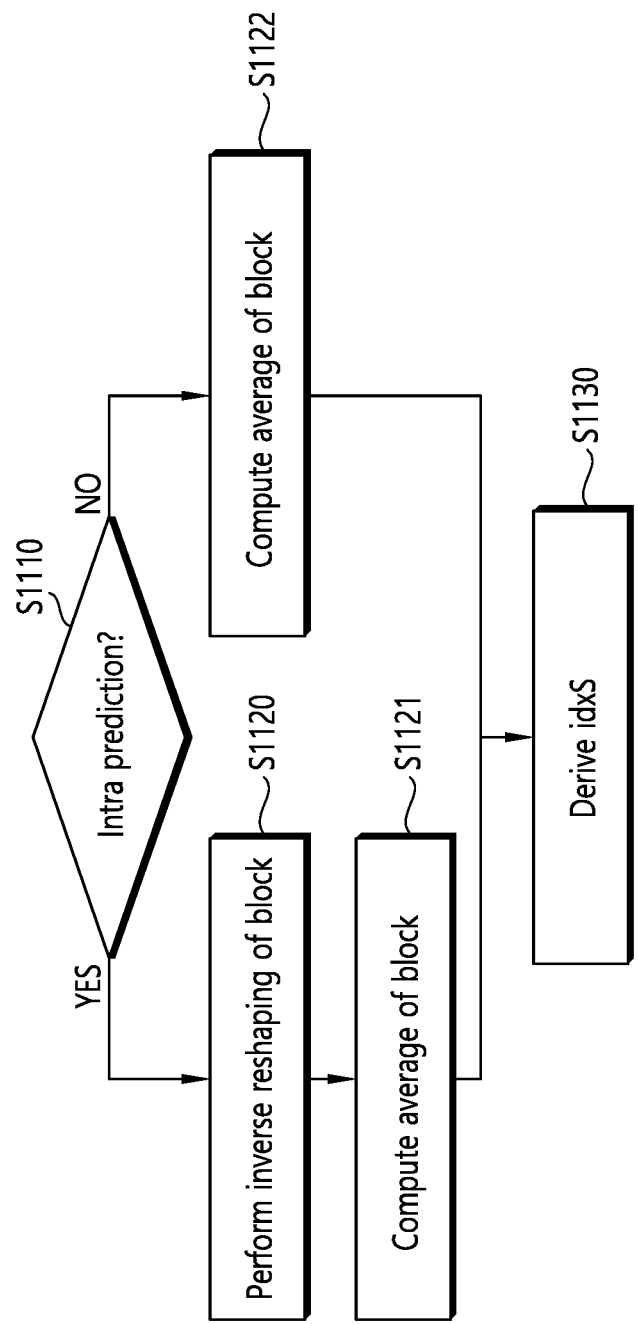
FIG. 11 is a flowchart illustrating a method of deriving a chroma residual scaling index according to another embodiment of the present document.

FIG. 11 is a flowchart illustrating a method of deriving a chroma residual scaling index according to another embodiment of the present document. FIG. 11 will be described with reference to FIG. 10. Steps S1110 and S1122 of FIG. 11 may be substantially the same as steps S1010 and S1022 of FIG. 10, respectively. In addition, when the prediction mode is the inter prediction mode, the features described with reference to FIG. 10 and FIG. 11 are substantially the same. Hereinafter, the difference between FIG. 10 and FIG. 11 will be mainly explained.

In operation S1120, when the prediction mode is the intra prediction mode, inverse reshaping (inverse mapping) may be performed (applied) on luma prediction sample values in the current block. Through inverse reshaping, luma prediction sample values based on the intra prediction mode may be mapped from the reshaped domain to the original domain. In one example, inverse reshaping for luma prediction sample values may be performed based on the reshaping model described with Table 4 or 6 above.

In step S1121, an average of the inverse reshaped luma samples may be calculated (derived). That is, an averaging process may be performed on the inverse mapped result.

In operation S1130, the chroma residual scaling index may be calculated based on an average of the inverse reshaped luma samples.

Also in this embodiment, as described with reference to FIG. 10, the chroma residual scaling index may be derived (calculated) based on a bit shifting operation. That is, the chroma residual scaling index may be derived (calculated) based on Equations 13 and/or 14 described above. According to the present embodiment, calculation of the chroma residual scaling index may be simplified and the number of inverse mapping may be reduced, and thus image coding efficiency may be increased.

A chroma residual scaling factor for generating chroma reconstruction samples may be derived based on the chroma residual scaling index derived by the method described in FIG. FIG. 8, FIG. 9, FIG. 10, and/or FIG. 11.

In an embodiment, the chroma residual scaling factor may be derived based on the chroma residual scaling index. Equation 15 below is one example for deriving the chroma residual scaling factor.

$$s = ChromaScaleCoef[idxS] \qquad \text{[Equation 15]}$$

In Equation 15, s may represents the chroma residual scaling factor, and ChromaScaleCoef may be a variable (or array) derived based on Table 9 described above.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 12:
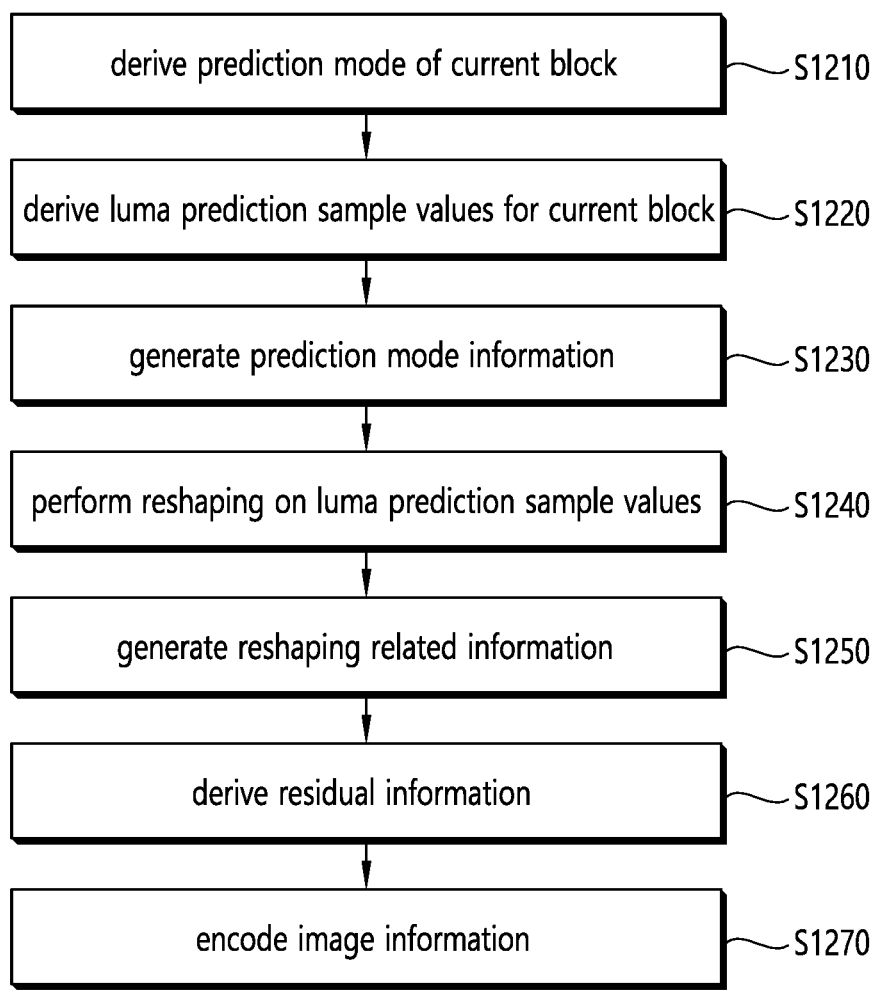
FIG. 12 exemplarily illustrates an image encoding method by an encoding apparatus according to the present document.
Figure 13:
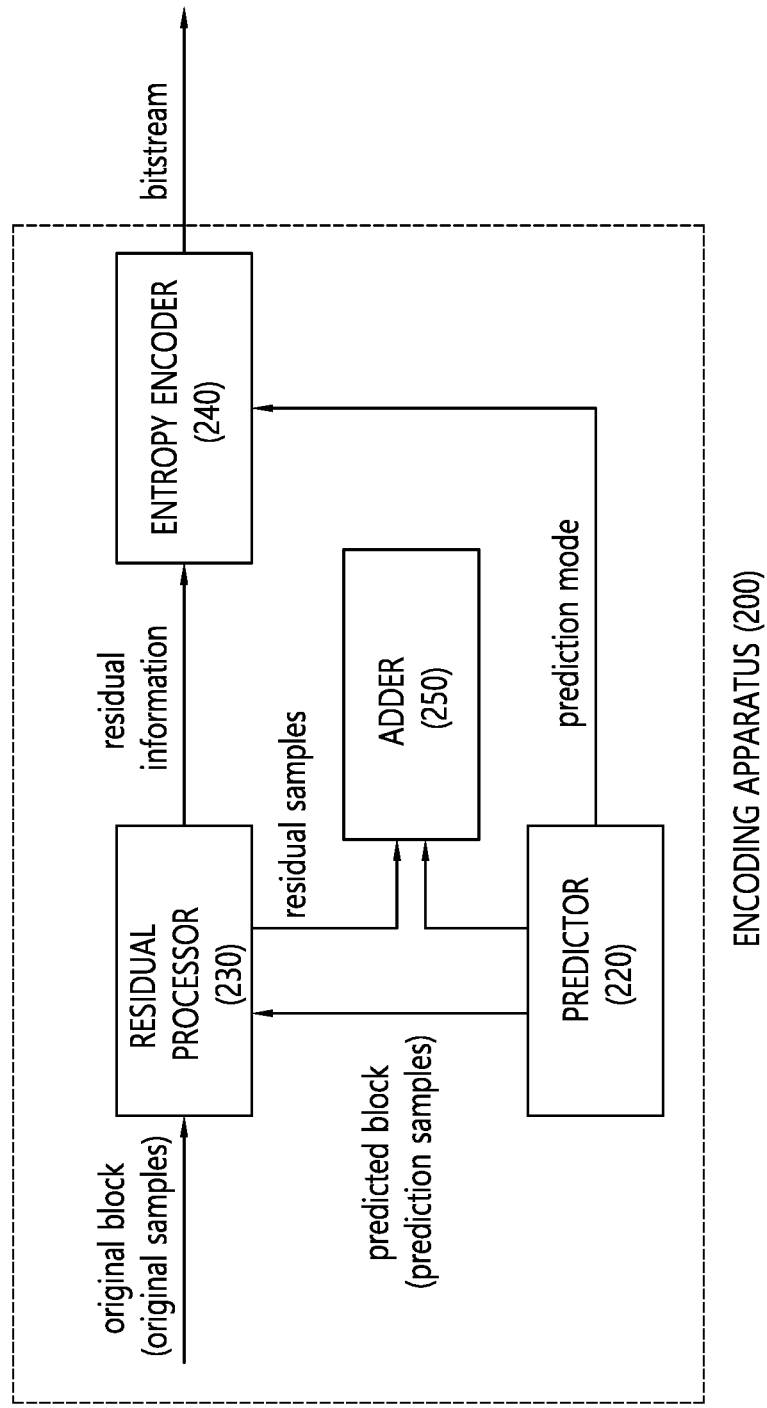
FIG. 13 exemplarily shows an encoding apparatus for performing an image encoding method according to the present document.

FIG. 12 exemplarily illustrates an image encoding method by an encoding apparatus according to the present document. FIG. 13 exemplarily shows an encoding apparatus for performing an image encoding method according to the present document. Specifically, for example, S1210 to S1230 of FIG. 12 may be performed by the predictor of the encoding apparatus, S1240 to S1250 of FIG. 12 may be performed by the residual processor and/or the adder of the encoding apparatus, S1260 of FIG. 12 may be performed by the residual processor of the encoding apparatus, and S1270 of FIG. 12 may be performed by the entropy encoder of the encoding apparatus.

The encoding apparatus may derive the prediction mode of the current block (S1210). In one example, the encoding apparatus may derive the prediction mode of the current block as the intra prediction mode. In the other example, the encoding apparatus may derive the prediction mode of the current block as the inter prediction mode.

The encoding apparatus may derive luma prediction sample values of the current block based on the prediction mode of the current block (S1220). Here, the luma prediction sample values of the current block may be referred to as luma component values of prediction samples in the current block. Similarly, chroma prediction sample values of the current block may be referred to as chroma component values of prediction samples in the current block.

The encoding apparatus may generate prediction mode information (S1230). The prediction mode information may be information on the prediction mode of the current block. In the decoding process, the prediction mode of the current block may be derived based on the prediction mode information.

The encoding apparatus may perform reshaping on the luma prediction sample values (S1240). The reshaping may be performed based on a determination as to whether the reshaping is linear. Whether the reshaper is linear may be determined from the reshaper model. For example, the determination of whether the reshaper is linear may follow the embodiment described with Table 6. That is, the reshaping may be performed based on the reshaping model including the syntax of Table 6.

The encoding apparatus may generate reshaping related information (S1250). The reshaping related information may include information on an absolute value of a delta codeword for deriving a linear or piecewise linear reshaper, and information on a sign of the delta codeword. In one embodiment, the encoding method of FIG. 12 may further include determining whether the reshaper used to perform reshaping is linear or piecewise linear, and generating information indicating whether the reshaper is linear or piecewise linear based on the determination. The reshaping related information may further include information indicating whether the reshaper used to perform reshaping is linear or piecewise linear.

In one embodiment, based on a determination that the reshaper is piecewise linear (if the reshaper is piecewise linear), the reshaping related information may include information on the absolute value and sign of the delta codeword for each of the plurality of bins.

In one embodiment, information on the absolute value of the delta codeword may be generated based on the absolute value of the delta codeword and the luma bit depth. For example, information on the absolute value of the delta codeword may be generated based on Equation 6 described above.

In one embodiment, based on the determination that the reshaper is linear (if the reshaper is linear), the reshaping related information includes information on the absolute value and the sign of the delta codeword, and the values of the delta codewords for a plurality of bins may be derived to be identical to each other based on the information on the absolute value and the sign of the delta codeword (related to the embodiment and description related to Equation 7 above). For example, the value of the delta codeword may be derived based on Equation 7 described above.

The encoding apparatus may derive residual information based on the reshaped luma prediction sample values (S1260). Specifically, the encoding apparatus may derive residual samples by subtracting luma prediction sample values from the original samples. The encoding apparatus may generate residual information based on the residual samples.

The encoding apparatus may encode image information including the prediction mode information, the reshaping related information, and the residual information (S1270). As described above, a transform and/or quantization procedure may be performed on the residual samples, and the residual information may include information on (quantized) transform coefficients. For example, image information encoded by the encoding apparatus may include syntaxes, syntax elements, and/or information on flags, variables, indices, and/or factors (i.e., the syntax related to a tile group header, the syntax related to the tile group reshaper model, information on the absolute value and the sign of the delta codeword, the chroma residual scaling index, and the chroma residual scaling factor).

The encoding apparatus may output the image information in the form of a bitstream. Meanwhile, the bitstream may be transmitted to the decoding apparatus through a network or a (digital) storage medium. Here, the network may include a broadcasting network and/or a communication network, and the digital storage medium may include various storage media such as USB, SD, CD, DVD, Blu-ray, HDD, and SSD.

Figure 14:
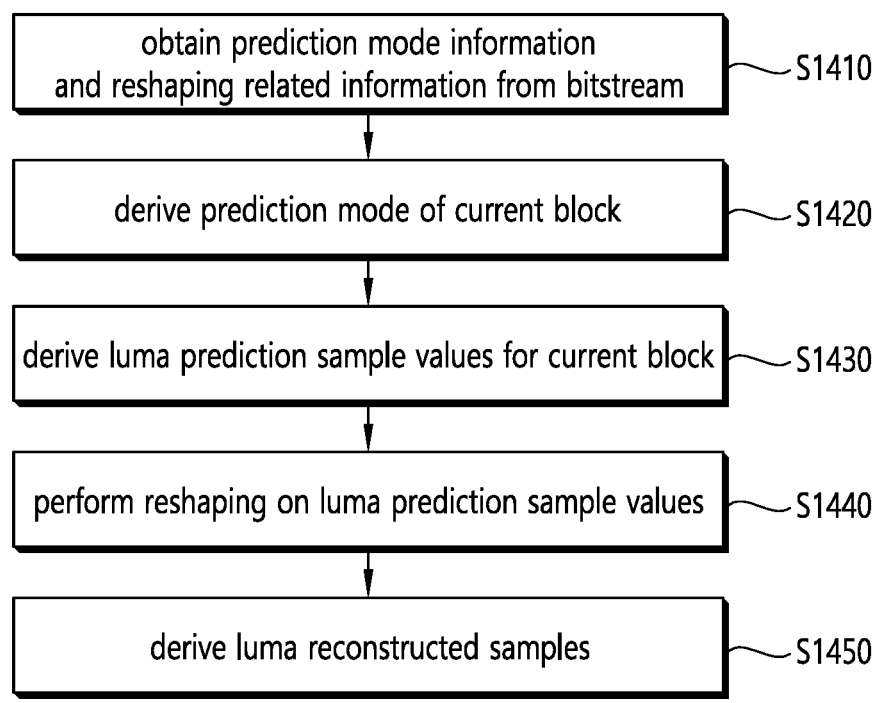
FIG. 14 exemplarily illustrates an image decoding method by a decoding apparatus according to the present document.
Figure 15:
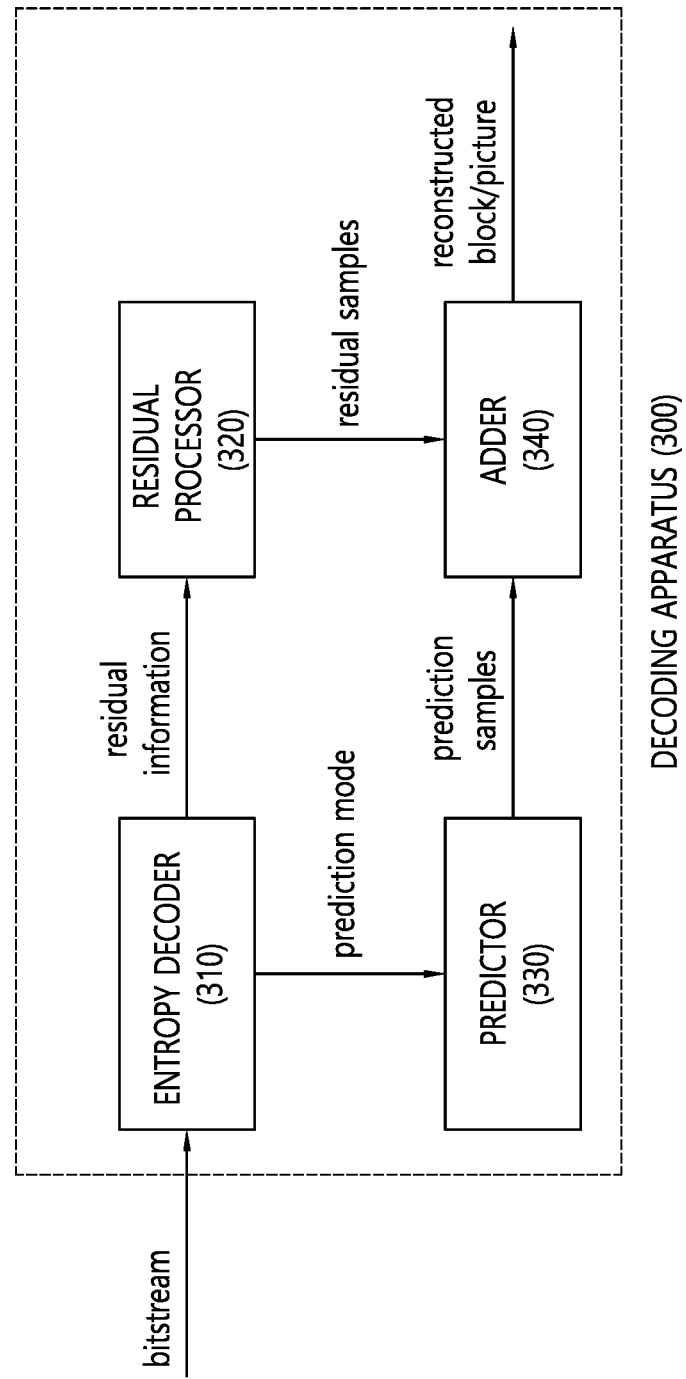
FIG. 15 exemplarily shows a decoding apparatus for performing an image decoding method according to the present document.

FIG. 14 exemplarily illustrates an image decoding method by a decoding apparatus according to the present document. FIG. 15 exemplarily shows a decoding apparatus for performing an image decoding method according to the present document. Specifically, for example, S1410 of FIG. 14 may be performed by the entropy decoder of the decoding apparatus, S1420 and S1430 of FIG. 14 may be performed by the predictor of the decoding apparatus, S1440 of FIG. 14 may be performed by the residual processor and/or the adder of the decoding apparatus, and S1450 of FIG. 14 may be performed by the adder of the decoding apparatus.

The decoding apparatus may obtain prediction mode information and/or reshaping related information from the bitstream (S1410). The reshaping related information may include information on an absolute value of a delta codeword for deriving a linear or piecewise linear reshaper and information on a sign of the delta codeword. In addition, the reshaping related information may include information indicating whether the reshaper used to perform reshaping is linear or piecewise linear, and based on the information indicating whether the reshaper is linear or piecewise linear, it may be determined whether the reshaper is linear or piecewise linear.

The decoding apparatus may derive the prediction mode of the current block (S1420). The decoding apparatus may derive the prediction mode of the current block based on the prediction mode information. In one example, the decoding apparatus may derive the prediction mode of the current block as the intra prediction mode. In another example, the decoding apparatus may derive the prediction mode of the current block as the inter prediction mode.

The decoding apparatus may derive luma prediction sample values of the current block based on the prediction mode of the current block (S1430). Here, the luma prediction sample values of the current block may be referred to as luma component values of prediction samples in the current block. Similarly, chroma prediction sample values of the current block may be referred to as chroma component values of prediction samples in the current block.

The decoding apparatus may perform reshaping on the luma prediction sample values (S1440). The decoding apparatus may perform reshaping on the luma prediction sample values based on the reshaping related information. The reshaping may be performed based on a determination as to whether the reshaping is linear. Whether the reshaper is linear may be determined from the reshaper model. For example, the determination of whether the reshaper is linear may follow the embodiment described with Table 6. That is, the reshaping may be performed based on the reshaping model including the syntax of Table 6.

In one embodiment, based on a determination that the reshaper is piecewise linear (if the reshaper is piecewise linear), the reshaping related information may include information on the absolute value and sign of the delta codeword for each of the plurality of bins.

In one embodiment, information on the absolute value of the delta codeword may be generated based on the absolute value of the delta codeword and the luma bit depth. For example, information on the absolute value of the delta codeword may be generated based on Equation 6 described above.

In one embodiment, based on the determination that the reshaper is linear (if the reshaper is linear), the reshaping related information includes information on the absolute value and the sign of the delta codeword, and the values of the delta codewords for a plurality of bins may be derived to be identical to each other based on the information on the absolute value and the sign of the delta codeword (related to the embodiment and description related to Equation 7 above). For example, the value of the delta codeword may be derived based on Equation 7 described above.

The decoding apparatus may derive (generate) luma reconstructed samples based on the reshaped luma prediction sample values (S1450). Specifically, luma reconstructed samples may be derived by summing reshaped luma prediction sample values and luma residual sample values. Residual samples may be derived based on comparison of original samples and prediction samples of the current block. For example, the decoding apparatus may receive information on the residual for the current block from a bitstream output from the encoding apparatus. The information on the residual may include a transform coefficient for a (luma) residual sample. The decoding apparatus may derive the residual sample (or residual sample array) for the current block based on the residual information. In this case, the decoding apparatus may generate the reconstructed samples based on the prediction samples and the residual samples.

As described above, a reconstructed block/picture may be generated based on the reconstructed samples generated by the decoding apparatus. Also, as described above, the decoding apparatus may generate the reconstructed samples based on the prediction samples and the residual samples. As described above, the in-loop filtering procedure such as deblocking filtering, SAO, ALF, and/or bidirectional filtering may be applied to the reconstructed picture in order to improve subjective/objective picture quality.

Through the LMCS according to the present document described above, the chroma residual scaling index can be derived based on a simple bit shifting operation, and the operation can be performed only on the average luma value (i.e., one value) and reshaping (The number of operations required for mapping) can be reduced.

In the above-described embodiments, the methods are described based on a flowchart as a series of steps or blocks, but the embodiments are not limited to the order of the steps, and some steps may be performed in a different order or at the same time as other steps as described above. In addition, those skilled in the art understand that the steps shown in the flowchart are not exclusive, and that other steps may be included or that one or more steps of the flowchart may be deleted without affecting the scope of the embodiments herein.

The method according to the above-described embodiments of the present document may be implemented in software form, and the encoding apparatus and/or decoding apparatus according to the present document is, for example, may be included in the apparatus that performs the image processing of a TV, a computer, a smart phone, a set-top box, a display device, etc.

When the embodiments in the present document are implemented in software, the above-described method may be implemented as a module (process, function, etc.) that performs the above-described function. A module may be stored in a memory and executed by a processor. The memory may be internal or external to the processor, and may be coupled to the processor by various well-known means. The processor may include an application-specific integrated circuit (ASIC), other chipsets, logic circuits, and/or data processing devices. Memory may include read-only memory (ROM), random access memory (RAM), flash memory, memory cards, storage media, and/or other storage devices. That is, the embodiments described in the present document may be implemented and performed on a processor, a microprocessor, a controller, or a chip. For example, the functional units shown in each figure may be implemented and performed on a computer, a processor, a microprocessor, a controller, or a chip. In this case, information on instructions or an algorithm for implementation may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (i.e., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present document is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (i.e., transmission through the Internet). In addition, a bitstream generated by the encoding method may be stored in a computer-readable recording medium or may be transmitted over wired/wireless communication networks.

In addition, the embodiments of the present document may be implemented with a computer program product according to program codes, and the program codes may be performed in a computer by the embodiments of the present document. The program codes may be stored on a carrier which is readable by a computer.

Figure 16:
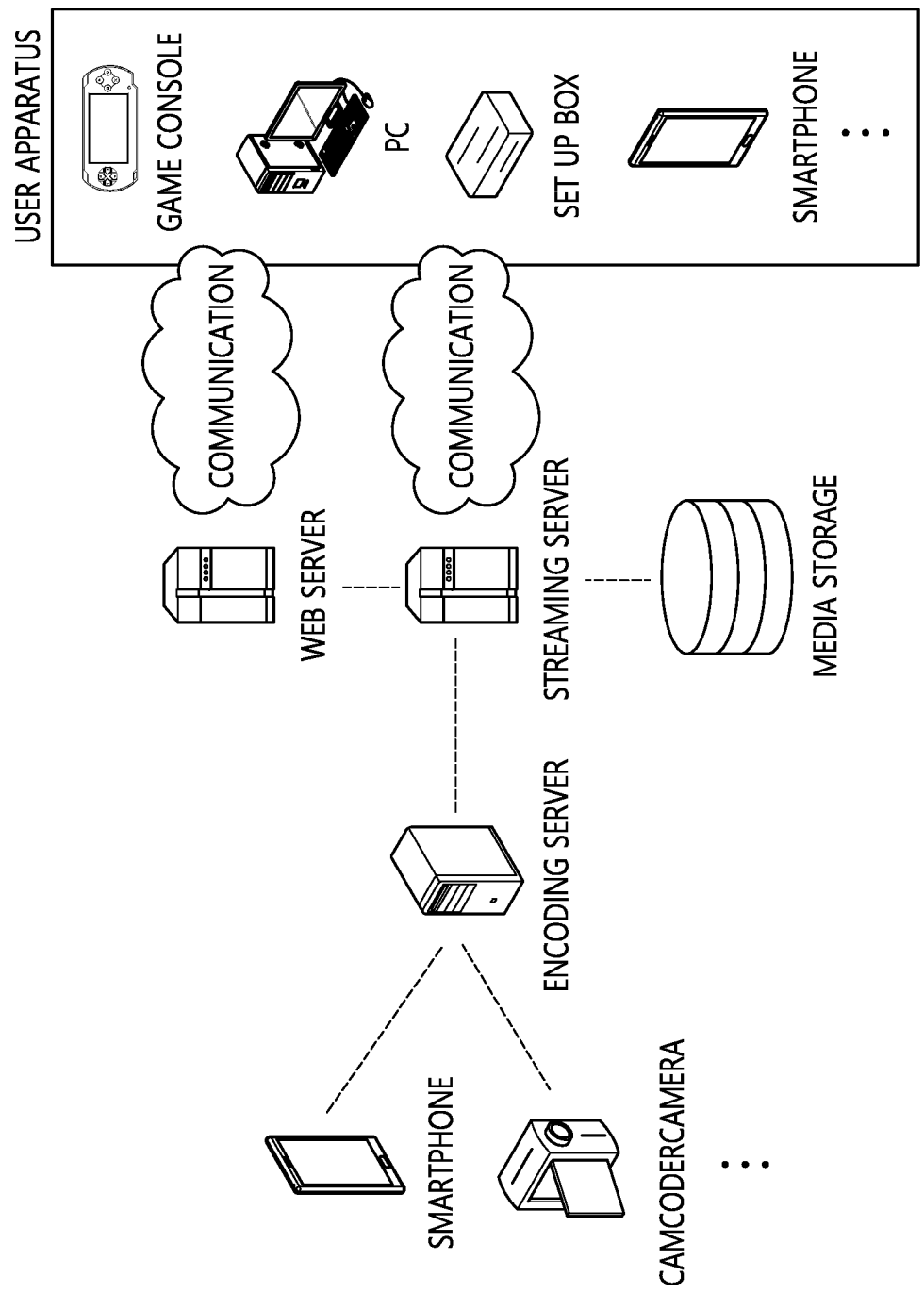
FIG. 16 exemplarily shows a content streaming system according to the present document.

FIG. 16 shows an example of a content streaming system according to the present document.

Referring to FIG. 16, the content streaming system to which the embodiment(s) of the present document is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, and in this case, data received from each server may be distributed and processed.

The claims described herein may be combined in various ways. For example, the technical features of the method claims of the present document may be combined and implemented as an apparatus, and the technical features of the apparatus claims of the present document may be combined and implemented as a method. In addition, the technical features of the method claim of the present document and the technical features of the apparatus claim may be combined to be implemented as an apparatus, and the technical features of the method claim of the present document and the technical features of the apparatus claim may be combined and implemented as a method.

What is claimed is:

1. An image decoding method performed by a decoding apparatus, the method comprising:
    obtaining prediction mode information and reshaping related information from a bitstream;
    deriving a prediction mode of a current block based on the prediction mode information;
    deriving luma prediction sample values of the current block based on the prediction mode of the current block;
    performing reshaping on the luma prediction sample values based on the reshaping related information; and
    deriving luma reconstructed samples based on reshaped luma prediction sample values,
    wherein the reshaping related information includes information on an absolute value of a delta codeword for deriving a linear or piecewise linear reshaper and information on a sign of the delta codeword,
    wherein the reshaping related information includes information specifying whether a reshaper used to perform reshaping is linear or piecewise linear,
    wherein based on the information specifying whether the reshaper is linear or piecewise linear, it is determined whether the reshaper is linear or piecewise linear, and
    wherein based on a determination that the reshaper is piecewise linear, the reshaping related information includes information on the absolute value and the sign of the delta codeword for each of a plurality of bins.

2. The method of claim 1, wherein the absolute value of the delta codeword is derived based on a luma bit depth.

3. The method of claim 2, wherein a value of the delta codeword is derived based on a following equation, $$RspDeltaCW[i] = (1 - 2 * \text{reshape\_model\_bin\_delta\_sign\_CW}[i]) *$$
$$(\text{reshape\_model\_bin\_delta\_abs\_CW}[i] << (BitDepth_Y - 10))$$

wherein RspDeltaCW[i] represents the value of the delta codeword, reshape_model_bin_delta_sign_CW[i] represents information on the sign of the delta codeword, reshape_model_bin_delta_abs_CW[i] represents information on the absolute value of the delta codeword, and $BitDepth_Y$ represents the luma bit depth.

4. The method of claim 1, wherein based on the determination that the reshaper is linear:
    the reshaping related information includes information on the absolute value and the sign of the delta codeword, and
    values of the delta codewords for a plurality of bins are derived to be identical to each other based on the information on the absolute value and the sign of the delta codeword.

5. The method of claim 4, wherein a value of the delta codeword is derived based on a following equation, $$RspDeltaCW[i] = (1 - 2 * \text{reshape\_model\_bin\_delta\_sign\_CW}) *$$
$$\text{reshape\_model\_max\_bin\_delta\_abs\_CW}$$

wherein RspDeltaCW[i] represents the value of the delta codeword, reshape_model_bin_delta_sign_CW represents information on the sign of the delta codeword, and reshape_model_bin_delta_abs_CW represents information on the absolute value of the delta codeword.

6. An image encoding method performed by an encoding apparatus, the method comprising:
    deriving a prediction mode of a current block;
    deriving luma prediction sample values of the current block based on the prediction mode;
    generating prediction mode information;
    performing reshaping on the luma prediction sample values;
    generating reshaping related information;
    deriving residual information based on reshaped luma prediction sample values; and
    encoding image information including the prediction mode information, the reshaping related information, and the residual information,
    wherein the reshaping related information includes information on an absolute value of a delta codeword for deriving a linear or piecewise linear reshaper and information on a sign of the delta codeword,
    wherein the reshaping related information includes information specifying whether a reshaper used to perform reshaping is linear or piecewise linear,
    wherein based on the information specifying whether the reshaper is linear or piecewise linear, it is determined whether the reshaper is linear or piecewise linear, and
    wherein based on a determination that the reshaper is piecewise linear, the reshaping related information includes information on the absolute value and the sign of the delta codeword for each of a plurality of bins.

7. The method of claim 6, wherein information on the absolute value of the delta codeword is generated based on the absolute value of the delta codeword and a luma bit depth.

8. The method of claim 7, wherein a value of the delta codeword is derived based on a following equation, $$RspDeltaCW[i] = (1 - 2*\text{reshape\_model\_bin\_delta\_sign\_CW}[i]) *$$
$$(\text{reshape\_model\_max\_bin\_delta\_abs\_CW}[i] << (BitDepth_Y - 10))$$

wherein RspDeltaCW[i] represents the value of the delta codeword, reshape_model_bin_delta_sign_CW[i] represents information on the sign of the delta codeword, reshape_model_bin_delta_abs_CW[i] represents information on the absolute value of the delta codeword, and $BitDepth_Y$ represents the luma bit depth.

9. The method of claim 6, wherein based on the determination that the reshaper is linear:
the reshaping related information includes information on the absolute value and the sign of the delta codeword, and
values of the delta codewords for a plurality of bins are derived to be identical to each other based on the information on the absolute value and the sign of the delta codeword.

10. The method of claim 9, wherein a value of the delta codeword is derived based on a following equation, $$RspDeltaCW[i] = (1 - 2*\text{reshape\_model\_bin\_delta\_sign\_CW}) *$$
$$\text{reshape\_model\_max\_bin\_delta\_abs\_CW}$$

wherein RspDeltaCW[i] represents the value of the delta codeword, reshape_model_bin_delta_sign_CW represents information on the sign of the delta codeword, and reshape_model_bin_delta_abs_CW represents information on the absolute value of the delta codeword.

11. A non-transitory computer-readable digital storage medium, storing encoded information causing a decoding apparatus to perform an image decoding method, the method comprising:
obtaining prediction mode information and reshaping related information from a bitstream;
deriving a prediction mode of a current block based on the prediction mode information;
deriving luma prediction sample values of the current block based on the prediction mode of the current block;
performing reshaping on the luma prediction sample values based on the reshaping related information; and
deriving luma reconstructed samples based on reshaped luma prediction sample values,
wherein the reshaping related information includes information on an absolute value of a delta codeword for deriving a linear or piecewise linear reshaper and information on a sign of the delta codeword,
wherein the reshaping related information includes information specifying whether a reshaper used to perform reshaping is linear or piecewise linear,
wherein based on the information specifying whether the reshaper is linear or piecewise linear, it is determined whether the reshaper is linear or piecewise linear, and
wherein based on a determination that the reshaper is piecewise linear, the reshaping related information includes information on the absolute value and the sign of the delta codeword for each of a plurality of bins.

* * * * *